United States Patent
Ashirgade et al.

(10) Patent No.: US 10,431,796 B2
(45) Date of Patent: *Oct. 1, 2019

(54) MULTI-REGION BATTERY SEPARATORS

(71) Applicant: Hollingsworth & Vose Company, East Walpole, MA (US)

(72) Inventors: Akshay Ashirgade, Northborough, MA (US); Zhiping Jiang, Nashua, NH (US); Nicolas Clement, Littleton, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 30 days.

This patent is subject to a terminal disclaimer.

(21) Appl. No.: 15/642,588

(22) Filed: Jul. 6, 2017

(65) Prior Publication Data
US 2018/0026247 A1    Jan. 25, 2018

Related U.S. Application Data

(63) Continuation of application No. 15/427,208, filed on Feb. 8, 2017, now Pat. No. 9,728,756, which is a
(Continued)

(51) Int. Cl.
*H01M 10/06* (2006.01)
*H01M 10/12* (2006.01)
(Continued)

(52) U.S. Cl.
CPC ....... *H01M 2/1613* (2013.01); *H01M 2/1686* (2013.01); *H01M 2/18* (2013.01);
(Continued)

(58) Field of Classification Search
None
See application file for complete search history.

(56) References Cited

U.S. PATENT DOCUMENTS

| 3,930,881 A | 1/1976 | Cestaro et al. |
| 4,137,377 A | 1/1979 | McClelland |

(Continued)

FOREIGN PATENT DOCUMENTS

| CN | 1168543 A | 12/1997 |
| CN | 200962440 Y | 10/2007 |

(Continued)

OTHER PUBLICATIONS

U.S. Appl. No. 15/510,339, filed Mar. 10, 2017, Natesh.
(Continued)

*Primary Examiner* — Scott J. Chmielecki
(74) *Attorney, Agent, or Firm* — Wolf, Greenfield & Sacks, P.C.

(57) ABSTRACT

Disclosed is a battery separator, comprising two fiber regions comprising glass fibers, and a middle fiber region disposed between them comprising larger average diameter fibers and specified amounts of silica, or fine fibers, or both; and processes for making the separator. Also disclosed is a battery separator, comprising a fiber region and either one or two silica-containing region(s) adjacent thereto, each of the regions containing a specified amount of silica; and processes for making the separator. Such separators are useful, e.g., in lead-acid batteries.

18 Claims, 10 Drawing Sheets

Related U.S. Application Data continuation of application No. 15/378,971, filed on Dec. 14, 2016, now Pat. No. 9,627,668, which is a continuation of application No. 15/018,931, filed on Feb. 9, 2016, now Pat. No. 9,577,236, which is a continuation of application No. 14/486,459, filed on Sep. 15, 2014, now Pat. No. 9,293,748.

(51) Int. Cl.
*H01M 2/16* (2006.01)
*H01M 2/18* (2006.01)
*H01M 2/14* (2006.01)

(52) U.S. Cl.
CPC ............ *H01M 10/06* (2013.01); *H01M 2/145* (2013.01); *H01M 2/166* (2013.01); *H01M 2/1646* (2013.01); *H01M 10/12* (2013.01); *Y02E 60/126* (2013.01)

(56) References Cited

U.S. PATENT DOCUMENTS

| | | | |
|---|---|---|---|
| 4,216,280 A | 8/1980 | Igarashi et al. |
| 4,216,281 A | 8/1980 | O'Rell et al. |
| 4,262,068 A | 4/1981 | Kono et al. |
| 4,336,314 A | 6/1982 | Yonezu et al. |
| 4,391,036 A | 7/1983 | Kishimoto et al. |
| 4,414,295 A | 11/1983 | Uba |
| 4,465,748 A | 8/1984 | Harris |
| 4,529,677 A | 7/1985 | Bodendorf |
| 4,618,401 A | 10/1986 | Bodendorf |
| 4,648,177 A | 3/1987 | Uba et al. |
| 5,009,971 A | 4/1991 | Johnson et al. |
| 5,035,966 A | 7/1991 | Tokunaga et al. |
| 5,075,184 A * | 12/1991 | Tanaka ................ H01M 2/1613 429/144 |
| 5,080,951 A | 1/1992 | Guthrie |
| 5,091,275 A | 2/1992 | Brecht et al. |
| 5,128,218 A | 7/1992 | Tokunaga et al. |
| 5,180,647 A | 1/1993 | Rowland et al. |
| 5,206,100 A | 4/1993 | Muto et al. |
| 5,225,298 A | 7/1993 | Nakayama et al. |
| 5,227,260 A | 7/1993 | Rose et al. |
| 5,281,498 A | 1/1994 | Muto et al. |
| 5,541,013 A | 7/1996 | Shiomi et al. |
| 5,645,956 A | 7/1997 | Degen et al. |
| 5,962,161 A | 10/1999 | Zucker |
| 5,972,500 A | 10/1999 | Gross et al. |
| 5,989,750 A | 11/1999 | Ohba et al. |
| 6,108,879 A | 8/2000 | Forte et al. |
| 6,143,441 A | 11/2000 | Zguris et al. |
| 6,225,005 B1 | 5/2001 | Shiomi et al. |
| 6,254,818 B1 | 7/2001 | Nitsche et al. |
| 6,306,539 B1 | 10/2001 | Zguris |
| 6,319,629 B1 | 11/2001 | De Ferreira |
| 6,406,813 B2 | 6/2002 | Rao |
| 6,495,288 B2 | 12/2002 | Shiomi et al. |
| 6,689,509 B2 | 2/2004 | Zucker |
| 6,703,161 B2 | 3/2004 | Zucker |
| 6,706,450 B2 | 3/2004 | Asada |
| 6,869,726 B2 | 3/2005 | Zucker |
| 6,939,645 B2 | 9/2005 | Sugiyama et al. |
| 7,097,939 B2 | 8/2006 | Ferreira et al. |
| 7,288,338 B2 | 10/2007 | Zguris |
| 7,481,076 B2 | 1/2009 | Windisch et al. |
| 7,682,738 B2 | 3/2010 | Ferreira et al. |
| 8,071,239 B2 | 12/2011 | Sugie et al. |
| 8,197,967 B2 | 6/2012 | Sugie et al. |
| 8,221,920 B2 | 7/2012 | Kawachi et al. |
| 8,404,378 B2 | 3/2013 | Whear et al. |
| 8,592,089 B2 | 11/2013 | La |
| 8,592,329 B2 | 11/2013 | Coon et al. |
| 8,722,231 B2 | 5/2014 | Brilmyer et al. |
| 9,293,748 B1 | 3/2016 | Ashirgade et al. |
| 9,577,236 B2 | 2/2017 | Ashirgade et al. |
| 9,627,668 B1 | 4/2017 | Ashirgade et al. |
| 9,728,756 B2 | 8/2017 | Ashirgade et al. |
| 9,786,885 B2 | 10/2017 | Jiang |
| 10,014,501 B2 | 7/2018 | Natesh et al. |
| 10,135,051 B2 | 11/2018 | Wertz et al. |
| 10,177,360 B2 | 1/2019 | Keisler et al. |
| 10,270,074 B2 | 4/2019 | Natesh et al. |
| 2002/0142226 A1 | 10/2002 | Zguris et al. |
| 2003/0008214 A1 | 1/2003 | Zguris |
| 2003/0022068 A1 | 1/2003 | Pekala |
| 2003/0054232 A1 | 3/2003 | Zucker |
| 2003/0054233 A1 | 3/2003 | Zucker |
| 2003/0054234 A1 | 3/2003 | Zucker |
| 2003/0054237 A1 | 3/2003 | Zucker |
| 2005/0084762 A1 | 4/2005 | Vaccaro et al. |
| 2006/0068294 A1 | 3/2006 | Mraz et al. |
| 2008/0241662 A1 | 10/2008 | Kawachi et al. |
| 2008/0299462 A1 | 12/2008 | Whear et al. |
| 2011/0091761 A1 | 4/2011 | Miller et al. |
| 2011/0143184 A1 | 6/2011 | McCarthy et al. |
| 2011/0217583 A1 | 9/2011 | Sugiyama et al. |
| 2011/0229750 A1 | 9/2011 | McLellan et al. |
| 2012/0070713 A1 | 3/2012 | Whear et al. |
| 2012/0070727 A1 | 3/2012 | Wertz et al. |
| 2012/0070728 A1 | 3/2012 | Wertz et al. |
| 2012/0070729 A1 | 3/2012 | Wertz et al. |
| 2012/0070747 A1 | 3/2012 | Whear et al. |
| 2012/0183862 A1 | 7/2012 | Gupta et al. |
| 2013/0071723 A1 | 3/2013 | Wertz et al. |
| 2013/0071734 A1 | 3/2013 | Wertz et al. |
| 2013/0071735 A1 | 3/2013 | Wertz et al. |
| 2013/0101887 A1* | 4/2013 | Sugiyama ........... H01M 2/1613 429/144 |
| 2013/0224632 A1 | 8/2013 | Roumi |
| 2013/0273409 A1 | 10/2013 | Nandi et al. |
| 2014/0038023 A1 | 2/2014 | Guo et al. |
| 2014/0087218 A1 | 3/2014 | Saito |
| 2014/0217583 A1 | 8/2014 | Yuzawa et al. |
| 2014/0227585 A1 | 8/2014 | Wertz et al. |
| 2014/0272535 A1* | 9/2014 | Clement ............. H01M 2/1613 429/145 |
| 2015/0099155 A1* | 4/2015 | Guo .................... H01M 2/1613 429/144 |
| 2016/0079581 A1 | 3/2016 | Ashirgade et al. |
| 2016/0149183 A1 | 5/2016 | Keisler et al. |
| 2016/0164058 A1 | 6/2016 | Ashirgade et al. |
| 2016/0301053 A1 | 10/2016 | Jiang |
| 2017/0062785 A1* | 3/2017 | Shi ...................... H01M 2/1686 |
| 2017/0092917 A1 | 3/2017 | Ashirgade et al. |
| 2017/0170442 A1 | 6/2017 | Ashirgade et al. |
| 2017/0179454 A1 | 6/2017 | Natesh et al. |
| 2017/0294639 A1 | 10/2017 | Natesh |
| 2017/0373293 A1 | 12/2017 | Jiang |
| 2018/0047964 A1 | 2/2018 | Natesh et al. |
| 2018/0145298 A1 | 5/2018 | Vulfson et al. |
| 2018/0175392 A1 | 6/2018 | Wertz et al. |
| 2018/0269452 A1 | 9/2018 | Natesh et al. |
| 2019/0115579 A1 | 4/2019 | Wertz et al. |

FOREIGN PATENT DOCUMENTS

| | | |
|---|---|---|
| CN | 201194241 Y | 2/2009 |
| CN | 201450040 U | 5/2010 |
| CN | 102891272 A | 1/2013 |
| EP | 0 226 876 A1 | 7/1987 |
| EP | 0 109 282 B1 | 9/1988 |
| EP | 0 613 201 A1 | 8/1994 |
| EP | 0 466 302 A1 | 10/1994 |
| EP | 0 680 105 A1 | 11/1995 |
| EP | 0 947 011 B1 | 12/2001 |
| EP | 1 585 182 A1 | 10/2005 |
| EP | 1 617 495 A1 | 1/2006 |
| EP | 0 949 705 B1 | 11/2006 |
| EP | 1 170 809 B1 | 7/2007 |
| EP | 1 444 742 B1 | 5/2011 |
| EP | 2 235 767 B1 | 8/2011 |
| EP | 2 352 187 A1 | 8/2011 |
| EP | 2 571 079 A1 | 3/2013 |
| EP | 2 571 091 A1 | 3/2013 |

(56) References Cited

FOREIGN PATENT DOCUMENTS

| | | |
|---|---|---|
| EP | 2 709 200 A1 | 3/2014 |
| JP | S59-16263 A | 1/1984 |
| JP | S63-143742 A | 6/1988 |
| JP | S63-146348 A | 6/1988 |
| JP | H03-8258 A | 1/1991 |
| JP | H04-32158 A | 2/1992 |
| JP | H06-295718 A | 10/1994 |
| JP | H07-176300 A | 7/1995 |
| JP | H07-201310 A | 8/1995 |
| JP | H09-92252 A | 4/1997 |
| JP | 2005-310426 A | 11/2005 |
| KR | 820001508 B1 | 8/1982 |
| WO | WO 98/12759 A1 | 3/1998 |
| WO | WO 98/52240 A1 | 11/1998 |
| WO | WO 2003/026037 A2 | 3/2003 |
| WO | WO 2008/067155 A2 | 6/2008 |
| WO | WO 2009/102946 A1 | 8/2009 |
| WO | WO 2010/127056 A1 | 11/2010 |
| WO | WO 2011/142096 A1 | 11/2011 |
| WO | WO 2012/040395 A2 | 3/2012 |
| WO | WO 2012/054667 A1 | 4/2012 |
| WO | WO 2014/149703 A1 | 9/2014 |

OTHER PUBLICATIONS

U.S. Appl. No. 15/127,057, filed Sep. 19, 2016, Natesh.
U.S. Appl. No. 13/834,597, filed Mar. 15, 2013, Clement et al.
U.S. Appl. No. 13/239,273, filed Sep. 21, 2011, Wertz et al.
U.S. Appl. No. 14/550,413, filed Nov. 21, 2014, Keisler et al.
U.S. Appl. No. 14/683,565, filed Apr. 10, 2015, Jiang.
U.S. Appl. No. 15/647,327, filed Jul. 12, 2017, Jiang.
U.S. Appl. No. 15/359,902, filed Nov. 23, 2016, Clement et al.
U.S. Appl. No. 15/380,990, filed Dec. 15, 2016, Wertz et al.
PCT/US2014/020484, Jun. 23, 2014, International Search Report and Written Opinion.
PCT/US2014/020484, Sep. 24, 2015, International Preliminary Report on Patentability.
PCT/US2015/049929, Dec. 4, 2015, International Search Report and Written Opinion.
International Search Report and Written Opinion for PCT/US2014/020484 dated Jun. 23, 2014.
International Preliminary Report on Patentability for PCT/US2014/020484 dated Sep. 24, 2015.
International Search Report and Written Opinion for PCT/US2015/049929 dated Dec. 4, 2015.
Mcgregor et al., Essential characteristics for separators in valve-regulated lead-acid batteries. Journal of Power Sources. 2002;111:288-303.
Turbak, Nonwovens: Theory, Process, Performance, and Testing. Tappi Press 1993. Excerpt pp. 144-147.
Zguris et al., Nonwovens Battery Separators to improve performance in lead acid battery systems. Mabat Conference. Warsaw, Poland. Jul. 24, 1991.
U.S. Appl. No. 15/552,328, filed Aug. 21, 2017, Natesh et al.
U.S. Appl. No. 16/282,950, filed Feb. 22, 2019, Natesh et al.
U.S. Appl. No. 15/983,299, filed May 18, 2018, Natesh et al.
U.S. Appl. No. 16/193,341, filed Nov. 16, 2018, Keisler et al.
U.S. Appl. No. 16/161,380, filed Oct. 16, 2018, Wertz et al.
U.S. Appl. No. 16/009,978, filed Jun. 15, 2018, Kumar et al.
U.S. Appl. No. 16/382,901, filed Apr. 12, 2019.

* cited by examiner

FIG. 10
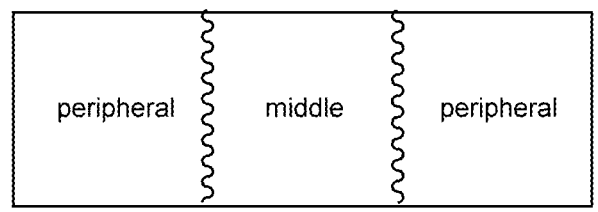
FIG. 10A
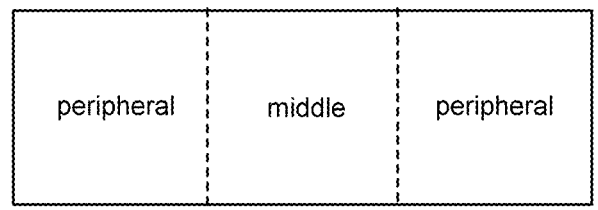
FIG. 10B
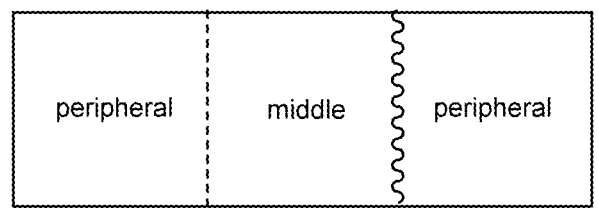
FIG. 10C
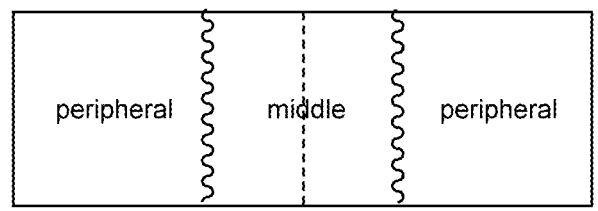
FIG. 10D

MULTI-REGION BATTERY SEPARATORS

RELATED APPLICATIONS

This application is a continuation of U.S. application Ser. No. 15/427,208, filed Feb. 8, 2017, which is a continuation of U.S. application Ser. No. 15/378,971 (now U.S. Pat. No. 9,627,668), filed Dec. 14, 2016, which is a continuation of U.S. application Ser. No. 15/018,931 (now U.S. Pat. No. 9,577,236), filed Feb. 9, 2016, which is a continuation of U.S. application Ser. No. 14/486,459 (now U.S. Pat. No. 9,293,748), filed Sep. 15, 2014, which are incorporated herein by reference in their entirety.

TECHNICAL FIELD

The invention relates to batteries, battery separators, and related methods.

BACKGROUND

Batteries are commonly used as energy sources. Typically, a battery includes a negative electrode and a positive electrode. The negative and positive electrodes are often disposed in an electrolytic medium. During discharge of a battery, chemical reactions occur wherein an active positive electrode material is reduced and active negative electrode material is oxidized. During the reactions, electrons flow from the negative electrode to the positive electrode through a load, and ions in the electrolytic medium flow between the electrodes. To prevent direct reaction of the active positive electrode material and the active negative electrode material, the electrodes are mechanically and electrically isolated from each other by a separator.

One type of battery is a lead-acid battery. In a lead acid battery, lead is usually an active negative electrode material, and lead dioxide is usually an active positive electrode material. (In a lead-acid battery, the electrodes are often referred to as "plates".) Generally, lead acid batteries also contain sulfuric acid, which serves as an electrolyte and participates in the chemical reactions.

A mat comprised of glass fibers may serve as a separator. The glass mat separator has a critical role in electrolyte filling. Any change in the physical properties of this material can drastically change the quality of the filled and formed battery. The separator structure, degree of compression and fiber composition have a significant influence on how well an unfilled element will accept electrolyte. While high levels of compression are desirable for extended life, this may make the filling and formation process more difficult. When the separator is compressed, the pore size is reduced, along with more restricted access to void, or empty volume in the separator. This will make the filling process more difficult.

When electrolyte is added to the battery, the ideal situation is that all areas are wetted as much as possible by the same amount and concentration of acid so that there is perfectly uniform distribution of electrolyte throughout the plate stack when the filling process is completed. This ideal situation is difficult or impossible to achieve in practice, as there is a dynamic competition between the separator and the plate surfaces for the electrolyte. As the electrolyte penetrates into the plate stack, it is held up by the separator (the capillary forces tend to hold the electrolyte rather strongly), and at the same time the electrolyte is depleted by the exothermic reaction of the sulfuric acid with the plate by the simple chemical reaction of $PbO+H_2SO_4 \Rightarrow PbSO_4+H_2O$. As the liquid front penetrates deeper into the stack it becomes more dilute and also gets hotter, due to the exothermic reaction with the lead oxide. One of the likely threats is the formation of hydration shorts/dendrites. As the acid reacts with the lead oxide, the sulfuric acid electrolyte becomes progressively more dilute. Lead sulfate is relatively soluble in the hot electrolyte with low acid strength and near neutral pH, and dissolved lead sulfate will diffuse into the separator. This will hasten the formation of lead dendrites and/or hydration shorts. A short circuit may develop and be detected during formation, or more subtly the battery will fail prematurely in service due to the formation of lead dendrites through the separator structure. If the filling process is poor or incomplete, individual cells may also have "dry areas" after filling. These poorly wetted areas may include no acid or water (completely dry), dilute acid or just water. These dry areas will slowly become wetted during and after formation, but significant grid corrosion may result due to unformed active material forcing all of the current to flow through the grid only.

During discharge, the sulfuric acid in the electrolyte is consumed and water is produced, diluting the acid concentration and causing the specific gravity of the electrolyte to decrease. During charging, formation of lead and lead oxide in the negative and positive plates, respectively, results in release of pure sulfuric acid. Due to its high specific gravity, the pure sulfuric acid tends to settle toward the bottom (or "stratify") in the electrolyte, a phenomenon known as "acid stratification". In a stratified battery, electrolyte concentrates at the bottom, starving the upper part of the cell. The light acid on top limits plate activation, promotes corrosion and reduces the performance, while the high acid concentration on the bottom makes the battery appear more charged than it is and artificially raises the open-circuit voltage.

Unfortunately, design or materials changes that improve battery performance and/or life, e.g., separators that exhibit resistance to acid stratification, generally may also tend to make proper filling more difficult.

SUMMARY

There is a need for a battery separator that improves acid filling and therefore improves battery performance and cycle life. A battery separator comprised of a middle fiber region of a specified thickness and containing coarse fibers disposed between two peripheral fiber regions containing fine fibers (a "3-region separator") can improve acid filling and plate formation by enhancing the diffusion of acid toward the interior region. As a result of improved wettability of such a separator, the density or concentration of the sulfuric acid is, in certain embodiments, maintained at an approximately constant level throughout the bulk of the separator. As a result, a uniform amount and concentration of acid is available for reaction with active material in the plates, thereby leading to homogenous plate formation and uniform active material utilization. This can lead to improved cycle life and reduced defect rate of the battery.

In some embodiments, the present invention encompasses the insight that such a 3-region battery separator in which the middle region additionally contains fine fiber, silica or both can exhibit other advantages. For example, a 3-region battery separator in which the middle region additionally contains a certain amount of fine fibers can exhibit a greater tensile strength while still providing an improved acid filling speed. Additionally, a 3-region battery separator in which the middle region additionally contains a certain amount of silica can exhibit increased resistance against acid stratification while still providing an improved acid filling speed.

Moreover, a 3-region battery separator in which the middle region additionally contains both a certain amount of fine fibers and a certain amount of silica can exhibit a greater tensile strength and increased resistance against acid stratification while still providing an improved acid filling speed.

In some embodiments, the present invention encompasses the insight that a battery separator comprising a fiber region adjacent to a fiber region having a certain amount of silica, or a fiber region disposed between two such silica-containing regions, can exhibit advantages. For example, such a separator can exhibit increased resistance against acid stratification while still providing an improved acid filling speed.

In one aspect, the invention relates to a battery separator, comprising: a middle fiber region; a first peripheral fiber region; and a second peripheral fiber region; wherein the middle fiber region comprises fibers having an average diameter of greater than or equal to 2 μm, and (a) from about 1 to 50% by weight fibers having an average diameter from about 0.1 to less than 2 μm, or (b) from about 1 to about 40% by weight silica, or (c) from about 1 to about 40% by weight fibers having an average diameter from about 0.1 to less than 2 μm, and from about 1 to about 20% by weight silica; wherein each of the first and second peripheral fiber regions independently comprises glass fibers having an average diameter of less than or equal to 2 μm; provided that the average diameter of the fibers of the middle fiber region is larger than the average diameter of the fibers of each of the first and second peripheral fiber regions; wherein the middle fiber region is disposed between the first peripheral fiber region and second peripheral fiber region; and wherein the thickness of the middle fiber region constitutes 1-49% of the total fiber region thickness.

In one aspect, the invention relates to a battery separator, comprising: a middle fiber region; a first peripheral fiber region; and a second peripheral fiber region; wherein the middle fiber region is disposed between the first peripheral fiber region and second peripheral fiber region; wherein the separator is produced by a process described herein.

In one aspect, the invention relates to a lead-acid battery comprising a negative plate, a positive plate, and a battery separator disposed between the negative and positive plates, wherein the battery separator comprises: a middle fiber region; a first peripheral fiber region; and a second peripheral fiber region; wherein the middle fiber region comprises fibers having an average diameter of greater than or equal to 2 μm, and (a) from about 1 to 50% by weight fibers having an average diameter from about 0.1 to less than 2 μm, or (b) from about 1 to about 40% by weight silica, or (c) from about 1 to about 40% by weight fibers having an average diameter from about 0.1 to less than 2 μm, and from about 1 to about 20% by weight silica; wherein each of the first and second peripheral fiber regions independently comprises glass fibers having an average diameter of less than or equal to 2 μm; provided that the average diameter of the fibers of the middle fiber region is larger than the average diameter of the fibers of each of the first and second peripheral fiber regions; wherein the middle fiber region is disposed between the first peripheral fiber region and second peripheral fiber region; and wherein the thickness of the middle fiber region constitutes 1-49% of the total fiber region thickness.

In one aspect, the invention relates to a lead-acid battery comprising a negative plate, a positive plate, and a battery separator disposed between the negative and positive plates, wherein the battery separator comprises a middle fiber region; a first peripheral fiber region; and a second peripheral fiber region; wherein the middle fiber region is disposed between the first peripheral fiber region and second peripheral fiber region; wherein the separator is produced by a process described herein.

In one aspect, the invention relates to a battery separator, comprising: a fiber region; and either (a) a silica-containing region adjacent to the fiber region, or (b) a first silica-containing region and a second silica-containing region, wherein the fiber region is disposed between the first silica-containing region and the second silica-containing region; wherein the fiber region and each silica-containing region contains fibers having an average diameter from about 2 to about 25 μm; wherein the fiber region contains less than 2% (including 0%) by weight silica; wherein each silica-containing region independently contains greater than or equal to 2% by weight silica.

In one aspect, the invention relates to a lead-acid battery comprising a negative plate, a positive plate, and a battery separator disposed between the negative and positive plates, wherein the battery separator comprises: a fiber region; and either (a) a silica-containing region adjacent to the fiber region, or (b) a first silica-containing region and a second silica-containing region, wherein the fiber region is disposed between the first silica-containing region and the second silica-containing region; wherein the fiber region and each silica-containing region contains fibers having an average diameter from about 2 to about 25 μm; wherein the fiber region contains less than 2% (including 0%) by weight silica; wherein each silica-containing region independently contains greater than or equal to 2% by weight silica.

BRIEF DESCRIPTION OF THE DRAWING

FIG. 10A, FIG. 10B, FIG. 10C and FIG. 10D show exemplary embodiments of a 3-region separator.

DETAILED DESCRIPTION

Definitions

Figure 1:
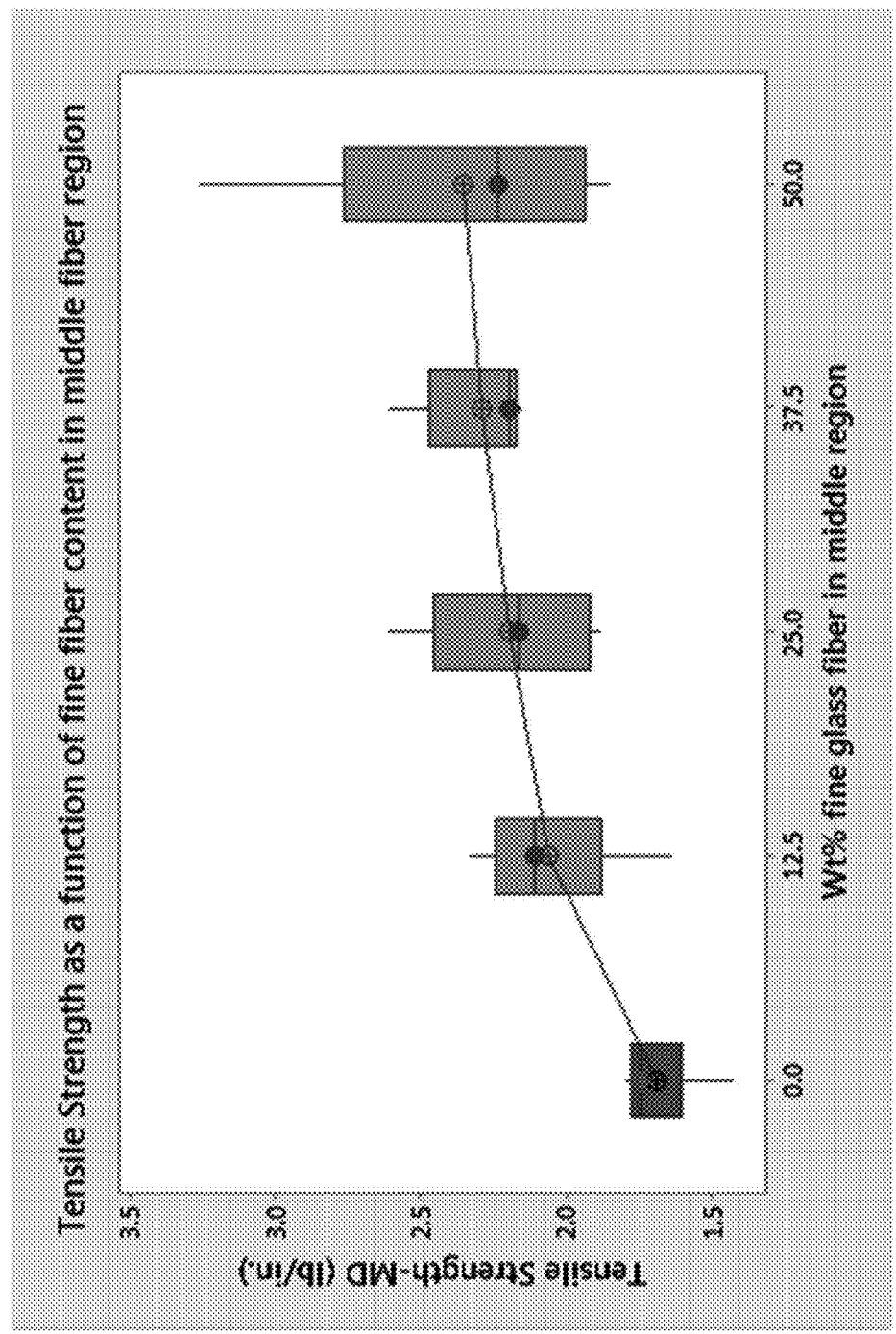
FIG. 1 shows how tensile strength of a 3-region separator varies in the machine direction based on the amount of fine fiber in the middle fiber region.

As used herein, "total fiber region thickness" refers to the sum of the thicknesses of the two peripheral fiber regions and the middle fiber region.

As used herein, the "thickness" of a region refers to the distance measured perpendicularly to the plane of the region from one end of the region to the opposite end of the region.

When a value is stated to be "between" two endpoints or "from" one endpoint to another endpoint, the endpoints are intended to be included. For example, a value "between 2 and 20" or "from 2 to 20" includes both 2 and 20 as well as the values between.

Unless otherwise specified, the terms "include", "includes", "including", etc. are intended to be open-ended. That is, "including A and B" means including but not limited to A and B.

Composition

In one aspect, the invention relates to a battery separator, comprising: a middle fiber region; a first peripheral fiber region; and a second peripheral fiber region; wherein the middle fiber region comprises fibers having an average diameter of greater than or equal to 2 μm; and (a) from about 1 to 50% by weight fibers having an average diameter from about 0.1 to less than 2 μm, or (b) from about 1 to about 40% by weight silica, or (c) from about 1 to about 40% by weight fibers having an average diameter from about 0.1 to less than 2 μm, and from about 1 to about 20% by weight silica; wherein each of the first and second peripheral fiber regions independently comprises glass fibers having an average diameter of less than or equal to 2 μm; provided that the average diameter of the fibers of the middle fiber region is larger than the average diameter of the fibers of each of the first and second peripheral fiber regions; wherein the middle fiber region is disposed between the first peripheral fiber region and second peripheral fiber region; and wherein the thickness of the middle fiber region constitutes 1-49% of the total fiber region thickness. In some embodiments, the middle fiber region comprises glass fibers having an average diameter of greater than or equal to 2 μm. Here and throughout, average diameter of fibers can be measured by techniques known in the art, e.g., using scanning electron microscopy (SEM).

As used herein in respect to such a separator, the "end" of a region refers to: (a) in the case of the end of a peripheral fiber region that is not adjacent to the middle fiber region, the outer surface of the peripheral fiber region, which may also be the outer surface of the separator; (b) in the case where the middle fiber region is laminated to a peripheral fiber region, the surface of the region at the point of lamination; (c) in the case where one fiber region transitions into another, such as the result of multi-phase formation, the midpoint of the transition zone, as defined herein.

Middle and Peripheral Fiber Regions—Generally

As used herein, the designations "middle" and "peripheral" in reference to the fiber regions of the separator are used in a relative sense. That is, the "peripheral" fiber regions are peripheral inasmuch as the "middle" fiber region is disposed between them. As noted above, the outer surface of the peripheral fiber region may also be the outer surface of the separator; however, it need not be. In some embodiments, the outer surface of the peripheral fiber region is the outer surface of the separator. In some embodiments, the separator comprises an additional layer adjacent to a "peripheral" fiber region.

In one aspect, the invention relates to a battery separator, consisting essentially of: a middle fiber region; a first peripheral fiber region; and a second peripheral fiber region; wherein the middle fiber region comprises fibers having an average diameter of greater than or equal to 2 μm; and (a) from about 1 to 50% by weight fibers having an average diameter from about 0.1 to less than 2 μm, or (b) from about 1 to about 40% by weight silica, or (c) from about 1 to about 40% by weight fibers having an average diameter from about 0.1 to less than 2 μm, and from about 1 to about 20% by weight silica; wherein each of the first and second peripheral fiber regions independently comprises glass fibers having an average diameter of less than or equal to 2 μm; provided that the average diameter of the fibers of the middle fiber region is larger than the average diameter of the fibers of each of the first and second peripheral fiber regions; wherein the middle fiber region is disposed between the first peripheral fiber region and second peripheral fiber region; and wherein the thickness of the middle fiber region constitutes 1-49% of the total fiber region thickness.

In part, the middle fiber region comprises fibers having an average diameter of greater than or equal to 2 μm. In some embodiments, the middle fiber region comprises fibers having an average diameter from 2 to about 50 μm. In some embodiments, the middle fiber region comprises fibers having an average diameter from 2 to about 20 μm. In some embodiments, the middle fiber region comprises fibers having an average diameter from about 3 to about 20 μm. In some embodiments, the middle fiber region comprises fibers having an average diameter from about 3 to about 18 μm. In some embodiments, the middle fiber region comprises fibers having an average diameter from about 3 to about 15 μm. In some embodiments, the middle fiber region comprises fibers having an average diameter from about 5 to about 15 μm. In some embodiments, the middle fiber region comprises fibers having an average diameter from about 7 to about 15 μm. In some embodiments, the middle fiber region comprises fibers having an average diameter from about 3 to about 12 μm. In some embodiments, the middle fiber region comprises fibers having an average diameter from about 5 to about 12 μm. In some embodiments, the middle fiber region comprises fibers having an average diameter from about 7 to about 12 μm. In some embodiments, the middle fiber region comprises fibers having an average diameter from about 5 to about 10 μm. In some embodiments, the middle fiber region comprises fibers having an average diameter from about 7 to about 9 μm. In some embodiments, the middle fiber region comprises fibers having an average diameter of greater than or equal to 2 μm. In some embodiments, the middle fiber region comprises fibers having an average diameter of greater than or equal to 3 μm. In some embodiments, the middle fiber region comprises fibers having an average diameter of greater than or equal to 5 μm. In some embodiments, the middle fiber region comprises fibers having an average diameter of greater than or equal to 7 μm.

In part, the middle fiber region comprises fibers having an average diameter of greater than or equal to 2 μm. In some embodiments, the middle fiber region comprises glass fibers having an average diameter of greater than or equal to 2 μm. In some embodiments, the middle fiber region comprises glass fibers having an average diameter from 2 to about 50 μm. In some embodiments, the middle fiber region comprises glass fibers having an average diameter from 2 to about 20 μm. In some embodiments, the middle fiber region comprises glass fibers having an average diameter from about 3 to about 20 μm. In some embodiments, the middle fiber region comprises glass fibers having an average diameter from about 3 to about 18 μm. In some embodiments, the middle fiber region comprises glass fibers having an average diameter from about 5 to about 15 μm. In some embodiments, the middle fiber region comprises glass fibers having an average diameter from about 7 to about 15 µm. In some embodiments, the middle fiber region comprises glass fibers having an average diameter from about 3 to about 12 µm. In some embodiments, the middle fiber region comprises glass fibers having an average diameter from about 5 to about 12 µm. In some embodiments, the middle fiber region comprises glass fibers having an average diameter from about 7 to about 12 µm. In some embodiments, the middle fiber region comprises glass fibers having an average diameter from about 5 to about 10 µm. In some embodiments, the middle fiber region comprises glass fibers having an average diameter from about 7 to about 9 µm. In some embodiments, the middle fiber region comprises glass fibers having an average diameter of greater than or equal to 2 µm. In some embodiments, the middle fiber region comprises glass fibers having an average diameter of greater than or equal to 3 µm. In some embodiments, the middle fiber region comprises glass fibers having an average diameter of greater than or equal to 5 µm. In some embodiments, the middle fiber region comprises glass fibers having an average diameter of greater than or equal to 7 µm.

The average diameter of the glass fibers in the first peripheral fiber region can be the same or different from the average diameter of the glass fibers in the second peripheral fiber region, as long as each average diameter is within the specified range. In some embodiments, each of the first and second peripheral fiber regions independently comprises glass fibers having an average diameter from about 0.1 to about 2 µm. In some embodiments, each of the first and second peripheral fiber regions independently comprises glass fibers having an average diameter from about 0.4 to about 1.8 µm. In some embodiments, each of the first and second peripheral fiber regions independently comprises glass fibers having an average diameter from about 0.6 to about 1.6 µm. In some embodiments, each of the first and second peripheral fiber regions independently comprises glass fibers having an average diameter from about 0.8 to about 1.6 µm. In some embodiments, each of the first and second peripheral fiber regions independently comprises glass fibers having an average diameter from about 1.0 to about 1.6 µm. In some embodiments, each of the first and second peripheral fiber regions independently comprises glass fibers having an average diameter from about 1.2 to about 1.6 µm. In some embodiments, each of the first and second peripheral fiber regions independently comprises glass fibers having an average diameter from about 0.4 to about 1.6 µm. In some embodiments, each of the first and second peripheral fiber regions independently comprises glass fibers having an average diameter from about 0.4 to about 1.4 µm. In some embodiments, each of the first and second peripheral fiber regions independently comprises glass fibers having an average diameter from about 0.4 to about 1.2 µm. In some embodiments, each of the first and second peripheral fiber regions independently comprises glass fibers having an average diameter from about 0.4 to about 1.0 µm. In some embodiments, each of the first and second peripheral fiber regions independently comprises glass fibers having an average diameter from about 0.4 to about 0.8 µm. In some embodiments, each of the first and second peripheral fiber regions independently comprises glass fibers having an average diameter from about 1.0 to about 1.4 µm. In some embodiments, each of the first and second peripheral fiber regions independently comprises glass fibers having an average diameter of less than or equal to 1.8 µm. In some embodiments, each of the first and second peripheral fiber regions independently comprises glass fibers having an average diameter of less than or equal to 1.6 µm. In some embodiments, each of the first and second peripheral fiber regions independently comprises glass fibers having an average diameter of less than or equal to 1.4 µm. In some embodiments, each of the first and second peripheral fiber regions independently comprises glass fibers having an average diameter of less than or equal to 1.2 µm. In some embodiments, each of the first and second peripheral fiber regions independently comprises glass fibers having an average diameter of less than or equal to 1.0 µm. In some embodiments, each of the first and second peripheral fiber regions independently comprises glass fibers having an average diameter of less than or equal to 0.8 µm.

Middle Fiber Region

In some embodiments, the thickness of the middle fiber region constitutes 1-49% of the total fiber region thickness. In some embodiments, the thickness of the middle fiber region constitutes 2-48% of the total fiber region thickness. In some embodiments, the thickness of the middle fiber region constitutes 3-47% of the total fiber region thickness. In some embodiments, the thickness of the middle fiber region constitutes 1-45% of the total fiber region thickness. In some embodiments, the thickness of the middle fiber region constitutes 5-45% of the total fiber region thickness. In some embodiments, the thickness of the middle fiber region constitutes 5-40% of the total fiber region thickness. In some embodiments, the thickness of the middle fiber region constitutes 5-35% of the total fiber region thickness. In some embodiments, the thickness of the middle fiber region constitutes 5-30% of the total fiber region thickness. In some embodiments, the thickness of the middle fiber region constitutes 5-25% of the total fiber region thickness. In some embodiments, the thickness of the middle fiber region constitutes 10-45% of the total fiber region thickness. In some embodiments, the thickness of the middle fiber region constitutes 10-40% of the total fiber region thickness. In some embodiments, the thickness of the middle fiber region constitutes 10-35% of the total fiber region thickness. In some embodiments, the thickness of the middle fiber region constitutes 10-30% of the total fiber region thickness. In some embodiments, the thickness of the middle fiber region constitutes 10-25% of the total fiber region thickness.

The middle fiber region can comprise or be a part of a woven or non-woven fiber web. In some embodiments, the middle fiber region comprises or is a part of a non-woven fiber web. In some embodiments, the middle fiber region comprises or is a part of a woven fiber web.

Middle Fiber Region: Coarse Fibers

In some embodiments, fibers having an average diameter from 2 to about 50 µm account for a specified percentage by weight of the middle fiber region. In some embodiments, fibers having an average diameter from 2 to about 50 µm, 2 to about 20 µm, about 3 to about 20 µm, about 3 to about 18 µm, about 3 to about 15 µm, about 5 to about 15 µm, about 7 to about 15 µm, about 3 to about 12 µm, about 5 to about 12 µm, about 7 to about 12 µm, about 5 to about 10 µm, about 7 to about 9 µm, greater than or equal to 2 µm, greater than or equal to 3 µm, greater than or equal to 5 µm, or greater than or equal to 7 µm account for at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or about 99% of the middle fiber region by weight. Fibers having each specified range of average diameter can account for each specified percentage by weight of the middle fiber region.

For example, fibers having an average diameter from about 5 to about 10 µm can account for at least 50% by weight of the middle fiber region, etc.

In some embodiments, the fibers of the middle fiber region having an average diameter from 2 to about 50 µm are at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or about 100% glass fibers.

In some embodiments, the middle fiber region comprises polymeric fibers. In some embodiments, the fibers of the middle fiber region having an average diameter from 2 to about 50 µm are at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or about 100% polymeric fibers. The polymeric fibers may be in the form of staple fibers or may form a scrim.

In some embodiments, glass fibers having an average diameter from 2 to about 50 µm account for a specified percentage by weight of the middle fiber region. In some embodiments, glass fibers having an average diameter from 2 to about 50 µm, 2 to about 20 µm, about 3 to about 20 µm, about 3 to about 18 µm, 3 to about 15 µm, about 5 to about 15 µm, about 7 to about 15 µm, about 3 to about 12 µm, about 5 to about 12 µm, about 7 to about 12 µm, about 5 to about 10 µm, about 7 to about 9 µm, greater than or equal to 2 µm, greater than or equal to 3 µm, greater than or equal to 5 µm, or greater than or equal to 7 µm account for at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or about 99% of the middle fiber region by weight. Glass fibers having each specified range of average diameter can account for each specified percentage by weight of the middle fiber region. For example, glass fibers having an average diameter from about 5 to about 10 µm can account for at least 50% by weight of the middle fiber region, etc.

Middle Fiber Region: Fine Fibers

In some embodiments, the middle fiber region comprises a specified amount (e.g., from about 1 to about 50% by weight) of fibers having an average diameter from about 0.1 to less than 2 µm. In some embodiments, these fibers have an average diameter from about 0.1 to about 0.8 µm. In some embodiments, these fibers have an average diameter from about 0.8 to about 1.6 µm. In some embodiments, these fibers have an average diameter from about 1.4 to about 1.9 µm. In some embodiments, these fibers have an average diameter from about 0.3 to about 1.9 µm. In some embodiments, these fibers have an average diameter from about 0.5 to about 1.8 µm. In some embodiments, these fibers have an average diameter from about 0.8 to about 1.8 µm. In some embodiments, these fibers have an average diameter from about 1.0 to about 1.7 µm. In some embodiments, these fibers have an average diameter from about 1.2 to about 1.6 µm. In some embodiments, these fibers have an average diameter from about 1.3 to about 1.5 µm. In some embodiments, these fibers have an average diameter of about 1.4 µm.

In some embodiments, the middle fiber region comprises a specified amount (e.g., from about 1 to about 50% by weight) of glass fibers having an average diameter from about 0.1 to less than 2 µm. In some embodiments, these glass fibers have an average diameter from about 0.1 to about 0.8 µm. In some embodiments, these glass fibers have an average diameter from about 0.8 to about 1.6 µm. In some embodiments, these glass have an average diameter from about 1.4 to about 1.9 µm. In some embodiments, these glass fibers have an average diameter from about 0.3 to about 1.9 µm. In some embodiments, these glass fibers have an average diameter from about 0.5 to about 1.8 µm. In some embodiments, these glass fibers have an average diameter from about 0.8 to about 1.8 µm. In some embodiments, these glass fibers have an average diameter from about 1.0 to about 1.7 µm. In some embodiments, these glass fibers have an average diameter from about 1.2 to about 1.6 µm. In some embodiments, these glass fibers have an average diameter from about 1.3 to about 1.5 µm. In some embodiments, these glass fibers have an average diameter of about 1.4 µm.

In some embodiments, the fibers of the middle fiber region having an average diameter from about 0.1 to less than 2 µm are at least 5%, at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or about 100% glass fibers.

Middle Fiber Region: Silica

In some embodiments, the middle fiber region comprises a specified amount (e.g., from about 1 to about 40% by weight) of silica. The silica can be precipitated silica, colloidal silica and/or fumed silica. The silica has a surface area of at least 5 m$^2$/g, e.g., from about 50 to about 750 m$^2$/g, from about 100 to about 700 m$^2$/g, from about 150 to about 650 m$^2$/g, from about 200 to about 600 m$^2$/g, from about 200 to about 550 m$^2$/g, from about 200 to about 500 m$^2$/g, from about 300 to about 500 m$^2$/g, or from about 400 to about 500 m$^2$/g. The average particle size of the silica can be from about 0.001 to about 20 µm, e.g., from about 1 to about 20 µm, or from about 10 to about 20 µm. In some embodiments, the silica is precipitated silica. In some embodiments, the silica is precipitated silica having a surface area from about 50 to about 750 m$^2$/g, from about 100 to about 700 m$^2$/g, from about 150 to about 650 m$^2$/g, from about 200 to about 600 m$^2$/g, from about 200 to about 550 m$^2$/g, from about 200 to about 500 m$^2$/g, from about 300 to about 500 m$^2$/g, or from about 400 to about 500 m$^2$/g. In some embodiments, the silica is precipitated silica having an average particle size from about 0.001 to about 20 µm, from about 1 to about 20 µm, or from about 10 to about 20 µm. In some embodiments, the silica is precipitated silica having a surface area from about 50 to about 750 m$^2$/g, from about 100 to about 700 m$^2$/g, from about 150 to about 650 m$^2$/g, from about 200 to about 600 m$^2$/g, from about 200 to about 550 m$^2$/g, from about 200 to about 500 m$^2$/g, from about 300 to about 500 m$^2$/g, or from about 400 to about 500 m$^2$/g, and having an average particle size from about 0.001 to about 20 µm, from about 1 to about 20 µm, or from about 10 to about 20 µm. In some embodiments, the silica is precipitated silica having a surface area from about 200 to about 500 m$^2$/g and an average particle size from about 1 to about 20 µm. In some embodiments, the silica is precipitated silica having a surface area from about 400 to about 500 m$^2$/g and an average particle size from about 10 to about 20 µm.

Middle Fiber Region Content: With Fine Fibers

In some embodiments, the middle fiber region contains fine fibers. In some embodiments, fibers having an having an average diameter from about 0.1 to less than 2 µm account for a specified percentage by weight of the middle fiber region. In some embodiments, fibers having an average diameter from about 0.1 to less than 2 µm, about 0.1 to about 0.8 µm, about 0.8 to about 1.6 µm, about 1.4 to about 1.9 µm, about 0.3 to about 1.9 µm, about 0.5 to about 1.8 µm, about 0.8 to about 1.8 µm, about 1.0 to about 1.7 µm, about 1.2 to about 1.6 µm, about 1.3 to about 1.5 µm, or about 1.4 µm account for about 1 to 50%, about 2 to about 45%, about 3 to about 40%, about 5 to about 40%, about 5 to about 35%, about 5 to about 30%, about 5 to about 25%, about 10 to about 45%, about 10 to about 40%, about 10 to about 35%, about 10 to about 30%, or about 10 to about 25% of the middle fiber region by weight. Fibers having each specified range of average diameter can account for each specified percentage by weight of the middle fiber region. For example, fibers having an average diameter from about 0.8 to about 1.6 µm can account for about 10 to about 30% by weight of the middle fiber region, etc.

Middle Fiber Region Content: With Silica

In some embodiments, the middle fiber region contains silica. In some embodiments, silica accounts for a specified percentage by weight of the middle fiber region. In some embodiments, silica accounts for about 1 to about 40%, about 2 to about 40%, about 2 to about 35%, about 2 to about 30%, about 2 to about 25%, about 2 to about 20%, about 2 to about 15%, about 5 to about 35%, about 5 to about 30%, about 5 to about 25%, about 5 to about 20% or about 5 to about 15% of the middle fiber region by weight.

Middle Fiber Region Content: With Fine Fibers and Silica

In some embodiments, the middle fiber region contains both fine fibers and silica. In some embodiments, fibers having a specified average diameter and silica each account for a specified percentage by weight of the middle fiber region. In some embodiments, fibers having an average diameter from about 0.1 to less than 2 µm, about 0.1 to about 0.8 µm, about 0.8 to about 1.6 µm, about 1.4 to about 1.9 µm, about 0.3 to about 1.9 µm, about 0.5 to about 1.8 µm, about 0.8 to about 1.8 µm, about 1.0 to about 1.7 µm, about 1.2 to about 1.6 µm, about 1.3 to about 1.5 µm, or about 1.4 µm account for about 1 to 40%, about 2 to about 40%, about 3 to about 40%, about 5 to about 40%, about 5 to about 35%, about 5 to about 30%, about 5 to about 25% or about 5 to about 20% of the middle fiber region by weight, and silica accounts for about 1 to about 20%, about 1 to about 15%, about 2 to about 20%, about 2 to about 15%, about 3 to about 20%, about 3 to about 15% or about 5 to about 15% of the middle fiber region by weight. Fibers having each specified range of average diameter can account for each specified percentage by weight of the middle fiber region, and independently silica can account for each specified percentage by weight of the middle fiber region. For example, fibers having an average diameter from about 0.3 to about 1.9 µm can account for about 1 to about 40% by weight and silica can account for about 1 to about 20% by weight of the middle fiber region; fibers having an average diameter from about 0.8 to about 1.8 µm can account for about 5 to about 30% by weight and silica can account for about 2 to about 15% by weight of the middle fiber region; fibers having an average diameter from about 1.0 to about 1.7 µm can account for about 5 to about 25% by weight and silica can account for about 3 to about 15% by weight of the middle fiber region; fibers having an average diameter from about 1.2 to about 1.6 µm can account for about 5 to about 20% by weight and silica can account for about 5 to about 15% by weight of the middle fiber region; etc. In all such embodiments in which the middle fiber region contains both fine fibers and silica, the form, surface area and particle size is as described above under "middle fiber region: silica".

Peripheral Fiber Region

The thickness of the first peripheral fiber region can be the same or different from the thickness of the second peripheral fiber region. In some embodiments, the thickness of the first peripheral fiber region is from 70 to 130% of the thickness of the second peripheral fiber region. In some embodiments, the thickness of the first peripheral fiber region is from 80 to 120% of the thickness of the second peripheral fiber region. In some embodiments, the thickness of the first peripheral fiber region is from 90 to 110% of the thickness of the second peripheral fiber region.

In some embodiments, glass fibers having a specified average diameter account for a specified percentage by weight of the either the first or the second peripheral fiber region, or each peripheral fiber region independently. In some embodiments, glass fibers having an average diameter from about 0.1 to about 2 µm, about 0.4 to about 1.8 µm, about 0.6 to about 1.6 µm, about 0.8 to about 1.6 µm, about 1.0 to about 1.6 µm, about 1.2 to about 1.6 µm, about 0.4 to about 1.6 µm, about 0.4 to about 1.4 µm, about 0.4 to about 1.2 µm, about 0.4 to about 1.0 µm, about 0.4 to about 0.8 µm, about 1.0 to about 1.4 µm, less than or equal to 1.8 µm, less than or equal to 1.6 µm, less than or equal to 1.4 µm, less than or equal to 1.2 µm, less than or equal to 1.0 µm, or less than or equal to 0.8 µm account for at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90%, at least 95%, or about 100% of either the first or the second peripheral fiber region, or each peripheral fiber region independently, by weight. Glass fibers having each specified range of average diameter can account for each specified percentage by weight of either the first or the second peripheral fiber region, or each peripheral fiber region independently. For example, glass fibers having an average diameter from about 0.4 to about 1.8 µm can account for at least 50% by weight of either the first or the second peripheral fiber region, or each peripheral fiber region independently, etc.

In some embodiments, the average glass fiber diameter of the first peripheral fiber region differs from the average glass fiber diameter of the second peripheral fiber region by greater than or equal to 0.5, 0.6, 0.7, 0.8, 0.9, 1.0, 1.1 or 1.2 µm. Each combination of average glass fiber diameter in each peripheral fiber region that permits the difference in average fiber diameter to be achieved is contemplated. For example, each peripheral fiber region can have an average glass fiber diameter of from about 0.4 to about 1.8 µm, provided that the average glass fiber diameter of the first peripheral fiber region differs from the average glass fiber diameter of the second peripheral fiber region by greater than or equal to 1.2 µm; each peripheral fiber region can have an average glass fiber diameter of from about 0.8 to about 1.6 µm, provided that the average glass fiber diameter of the first peripheral fiber region differs from the average glass fiber diameter of the second peripheral fiber region by greater than or equal to 0.5 µm; the first peripheral fiber region can have an average glass fiber diameter of from about 0.4 to about 1.0 µm, and the second peripheral fiber region can have an average glass fiber diameter of from about 1.0 to about 1.6 µm, provided that the average glass fiber diameter of the first peripheral fiber region differs from the average glass fiber diameter of the second peripheral fiber region by greater than or equal to 0.7 µm; etc.

In some embodiments, the average pore size of the first peripheral fiber region differs from the average pore size of the second peripheral fiber region. In some embodiments, the average pore size of the first peripheral fiber region differs from the average pore size of the second peripheral fiber region by greater than or equal to 0.2 µm, 0.4 µm, 0.6

μm, 0.8 μm, 1 μm, 1.2 μm, 1.4 μm, 1.6 μm, 1.8 μm, 2.0 μm, 2.2 μm, 2.4 μm, 2.6 μm, 2.8 μm or 3.0 μm. The pore size can be measured according to the Battery Council International Standard BCIS-03a (Rev February 02) method "Standard Test Method for Pore Size Characteristics by the Liquid Porosimetry Method Of Recombinant Battery Separator Mat" or "Standard Test Method for Pore Size Characteristics by the Mercury Intrusion Method of Recombinant Battery Separator Mat".

Either peripheral fiber region can comprise or be a part of a woven or non-woven fiber web. In some embodiments, a peripheral fiber region comprises or is a part of a non-woven fiber web. In some embodiments, each of the first and second peripheral fiber regions comprises or is a part of a non-woven fiber web. In some embodiments, a peripheral fiber region comprises or is a part of a woven fiber web. In some embodiments, each of the first and second peripheral fiber regions comprises or is a part of a woven fiber web.

Glass Fibers

In some embodiments, the glass fibers of any or all of the middle fiber region and each of the peripheral fiber regions includes microglass fibers, chopped strand glass fibers, or a combination thereof. Microglass fibers and chopped strand glass fibers are known to those skilled in the art. One skilled in the art is able to determine whether a glass fiber is microglass or chopped strand by observation (e.g., optical microscopy, electron microscopy). The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than 1 μm in diameter and coarse microglass fibers are greater than or equal to 1 μm in diameter.

Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures.

The microglass fibers can have small diameters such as less than 10.0 μm. For example, the average diameter of the microglass fibers in a region—as opposed to the average diameter of all the glass fibers in a region—may be between 0.1 μm to about 9.0 μm; and, in some embodiments, between about 0.3 μm and about 6.5 μm, or between about 1.0 μm and 5.0 μm. In certain embodiments, the microglass fibers may have an average fiber diameter of less than about 7.0 μm, less than about 5.0 μm, less than about 3.0 μm, or less than about 1.0 μm. In certain embodiments, the microglass fibers may be subjected to a rotary spinning process and have an average fiber diameter of between about 1.0 and about 10.0 μm, e.g., between about 3.0 and about 9.0 μm, between about 5.0 and about 8.0 μm, between about 6.0 and about 10.0 μm, or between about 7.0 and about 9.0 μm; or about 9.5 μm, about 9.0 μm, about 8.5 μm, about 8.0 μm, about 7.5 μm, about 7.0, about 7.0 μm, about 6.5 μm, about 6.0 μm, about 5.5 μm, about 5.0 μm, about 4.5 μm, about 4.0 μm, about 3.5 μm, about 3.0 μm, about 2.5 μm, about 2.0 μm, or about 1.5 μm. Average diameter distributions for microglass fibers are generally log-normal. However, it can be appreciated that microglass fibers may be provided in any other appropriate average diameter distribution (e.g., Gaussian distribution, a distribution with a geometric standard deviation of twice the average diameter, etc.).

The microglass fibers may vary significantly in length as a result of process variations. In some embodiments, the microglass fibers have a length less than or equal to about 30 mm. In some embodiments, the microglass fibers have a length less than or equal to about 6 mm. In some embodiments, the microglass fibers have a length less than or equal to about 12 mm. In some embodiments, the microglass fibers have a length from about 6 mm to about 30 mm. The aspect ratios (length to diameter ratio) of the microglass fibers in a region may be generally in the range of about 100 to 10,000. In some embodiments, the aspect ratio of the microglass fibers in a region are in the range of about 200 to 2500; or, in the range of about 300 to 600. In some embodiments, the average aspect ratio of the microglass fibers in a region may be about 1,000; or about 300. It should be appreciated that the above-noted dimensions are not limiting and that the microglass fibers may also have other dimensions.

Coarse microglass fibers, fine microglass fibers, or a combination of microglass fibers thereof may be included within any particular region. In some embodiments, coarse microglass fibers make up between about 20% by weight and about 90% by weight of the glass fibers in the middle fiber region and/or one or both of the peripheral fiber regions. In some cases, for example, coarse microglass fibers make up between about 30% by weight and about 60% by weight of the glass fibers, or between about 40% by weight and about 60% by weight of the glass fibers in the middle fiber region and/or one or both of the peripheral fiber regions. For certain embodiments that include fine microglass fibers, the fine microglass fibers make up between about 0% and about 70% by weight of the glass fibers in the middle fiber region and/or one or both of the peripheral fiber regions. In some cases, for example, fine microglass fibers make up between about 5% by weight and about 60% by weight of the glass fibers, or between about 30% by weight and about 50% by weight of the glass fibers in the middle fiber region and/or one or both of the peripheral fiber regions.

The chopped strand glass fibers may have an average fiber diameter that is greater than the diameter of the microglass fibers. In some embodiments, the chopped strand glass fibers have an average diameter of greater than about 5 μm. For example, the average diameter range may be up to about 30 μm. In some embodiments, the chopped strand glass fibers may have an average fiber diameter between about 5 μm and about 12 μm. In certain embodiments, the chopped strand fibers may have an average fiber diameter of less than about 10.0 μm, less than about 8.0 μm, less than about 6.0 μm. Average diameter distributions for chopped strand glass fibers are generally log-normal. Chopped strand diameters tend to follow a normal distribution. Though, it can be appreciated that chopped strand glass fibers may be provided in any appropriate average diameter distribution (e.g., Gaussian distribution). In some embodiments, chopped strand glass fibers may have a length in the range of between about 0.125 inches and about 1 inch (e.g., about 0.25 inches, or about 0.5 inches). In some embodiments, chopped strand glass fibers may have a length greater than or equal to 1 mm.

In some embodiments, chopped strand glass fibers may have a length in the range of between about 3 mm and about 24 mm.

It should be appreciated that the above-noted dimensions are not limiting and that the microglass and/or chopped strand fibers may also have other dimensions.

In some embodiments, the separator has a combination of chopped strand glass fibers and microglass fibers. In some embodiments, the separator may contain between about 0 weight percent to about 100 weight percent chopped strand glass fibers. In some embodiments, the separator may contain between about 5 weight percent to about 15 weight percent chopped strand glass fibers. In some embodiments, the separator may contain between about 0 weight percent to about 100 weight percent microglass fibers. In some embodiments, the separator may contain between about 85 weight percent to about 95 weight percent microglass fibers. In some embodiments, the separator may contain between about 85 weight percent to about 100 weight percent microglass fibers.

In some embodiments, the middle fiber region has a combination of chopped strand glass fibers and microglass fibers. In some embodiments, the middle fiber region may contain between about 0 weight percent to about 100 weight percent chopped strand glass fibers. In some embodiments, the middle fiber region may contain between about 5 weight percent to about 15 weight percent chopped strand glass fibers. In some embodiments, the middle fiber region may contain between about 0 weight percent to about 100 weight percent microglass fibers. In some embodiments, the middle fiber region may contain between about 85 weight percent to about 95 weight percent microglass fibers. In some embodiments, the middle fiber region may contain between about 85 weight percent to about 100 weight percent microglass fibers. In some embodiments, the middle fiber region may contain between about 60 weight percent to about 85 weight percent microglass fibers. In some embodiments, the middle fiber region may contain between about 45 weight percent to about 60 weight percent microglass fibers.

In some embodiments, each of the first and second peripheral fiber regions independently has a combination of chopped strand glass fibers and microglass fibers. In some embodiments, each of the first and second peripheral fiber regions independently may contain between about 0 weight percent to about 100 weight percent chopped strand glass fibers. In some embodiments, each of the first and second peripheral fiber regions independently may contain between about 5 weight percent to about 15 weight percent chopped strand glass fibers. In some embodiments, each of the first and second peripheral fiber regions independently may contain between about 0 weight percent to about 100 weight percent microglass fibers. In some embodiments, each of the first and second peripheral fiber regions independently may contain between about 85 weight percent to about 95 weight percent microglass fibers. In some embodiments, each of the first and second peripheral fiber regions independently may contain between about 85 weight percent to about 100 weight percent microglass fibers.

Other Materials

Additionally, the separators can include a variety of other materials of construction. For example, the separator can include, in addition to glass fibers, non-glass fibers, natural fibers (e.g., cellulose fibers), synthetic fibers (e.g., polymeric), staple fibers, carbon fibers, nanofibers (electrospun, meltblown, centrifugal spun, etc.), fibrillated fibers, pulps (e.g., wood pulps), binder resin, ceramic materials or any combination thereof. Additionally, the fibers can include thermoplastic binder fibers. Exemplary thermoplastic fibers include bicomponent, polymer-containing fibers, such as sheath-core fibers, side-by-side fibers, "islands-in-the-sea" and/or "segmented-pie" fibers. Examples of types of polymeric fibers include substituted polymers, unsubstituted polymers, saturated polymers, unsaturated polymers (e.g., aromatic polymers), organic polymers, inorganic polymers, straight chained polymers, branched polymers, homopolymers, copolymers, and combinations thereof. Examples of polymer fibers include polyalkylenes (e.g., polyethylene, polypropylene, polybutylene), polyesters (e.g., polyethylene terephthalate), polyamides (e.g., nylons, aramids), halogenated polymers (e.g., polytetrafluoroethylenes), and combinations thereof. Bicomponent fibers can be, e.g., from 1.3 to 15 decitex (weight in grams of 10,000 meters of fiber); can have a fiber length of e.g., 1-24 mm. In some embodiments, the middle fiber region may contain between about 0 weight percent to about 30 weight percent of bicomponent fibers, (e.g., between about 1% and about 15%, between about 1% and about 8%, between about 6% and about 8%, between about 6% and about 10%, between about 10% and about 15% or between about 10% and about 20%). In some embodiments, each of the first and second peripheral fiber regions independently may contain between about 0 weight percent to about 30 weight percent of bicomponent fibers, (e.g., between about 1% and about 15%, between about 1% and about 8%, between about 6% and about 8%, between about 6% and about 10%, between about 10% and about 15% or between about 10% and about 20%).

Separator Characteristics

Surface Area

The BET surface area is measured according to method number 8 of Battery Council International Standard BCIS-03A (2009 revision), "BCI Recommended Test Methods VRLA-AGM Battery Separators", method number 8 being "Surface Area." Following this technique, the BET surface area is measured via adsorption analysis using a BET surface analyzer (e.g., Micromeritics Gemini II 2370 Surface Area Analyzer) with nitrogen gas; the sample amount is between 0.5 and 0.6 grams in a ¾ inch tube; and, the sample is allowed to degas at 75° C. for a minimum of 3 hours.

In some embodiments, in which the middle fiber region contains at least 1% by weight silica, the middle fiber region has a specific surface area, as measured using BET as described above, from about 1 to about 25 $m^2/g$, about 1 to about 15 $m^2/g$, about 1 to about 10 $m^2/g$, about 1 to about 7 $m^2/g$, about 2 to about 25 $m^2/g$, about 2 to about 15 $m^2/g$, about 2 to about 10 $m^2/g$ or about 2 to about 7 $m^2/g$.

In some embodiments, in which the middle fiber region contains both fine fibers and at least 1% by weight silica, the middle fiber region has a specific surface area, as measured using BET as described above, from about 1 to about 300 $m^2/g$, about 1 to about 250 $m^2/g$, about 1 to about 200 $m^2/g$, about 1 to about 150 $m^2/g$, about 1 to about 100 $m^2/g$, about 1 to about 75 $m^2/g$, about 1 to about 50 $m^2/g$, about 1 to about 30 $m^2/g$, about 1 to about 25 $m^2/g$, about 2 to about 300 $m^2/g$, about 2 to about 250 $m^2/g$, about 2 to about 200 $m^2/g$, about 2 to about 150 $m^2/g$, about 2 to about 100 $m^2/g$, about 2 to about 75 $m^2/g$, about 2 to about 50 $m^2/g$, about 2 to about 30 $m^2/g$, about 2 to about 25 $m^2/g$, about 3 to about 300 $m^2/g$, about 3 to about 250 $m^2/g$, about 3 to about 200 $m^2/g$, about 3 to about 150 $m^2/g$, about 3 to about 100 $m^2/g$, about 3 to about 75 $m^2/g$, about 3 to about 50 $m^2/g$, about 3 to about 30 $m^2/g$, about 3 to about 25 $m^2/g$, about 5 to about 300 $m^2/g$, about 5 to about 250 $m^2/g$, about 5 to about 200 $m^2/g$, about 5 to about 150 $m^2/g$, about 5 to about 100 $m^2/g$, about 5 to about 75 $m^2/g$, about 5 to about 50 m²/g, about 5 to about 30 m²/g, about 5 to about 25 m²/g, about 10 to about 300 m²/g, about 10 to about 250 m²/g, about 10 to about 200 m²/g, about 10 to about 150 m²/g, about 10 to about 100 m²/g, about 10 to about 75 m²/g, about 01 to about 50 m²/g, about 10 to about 30 m²/g or about 10 to about 25 m²/g.

In some embodiments, the specific surface area of each of the first and second peripheral fiber regions can independently range from approximately 1.0 m²/g to approximately 2.5 m²/g. For example, the specific surface area of each of the first and second peripheral fiber regions can independently range from approximately 1.3 m²/g to approximately 2.5 m²/g, from approximately 1.6 m²/g to approximately 2.5 m²/g, from approximately 1.9 m²/g to approximately 2.5 m²/g, from approximately 1.3 m²/g to approximately 2.2 m²/g, from approximately 1.3 m²/g to approximately 1.9 m²/g, or from approximately 1.6 m²/g to approximately 2.2 m²/g. If filler particles are used in a peripheral fiber region, the specific surface area of that fiber region can be greater than or equal to 2 m²/g.

Other Characteristics

The basis weight, or grammage, of the separator can range from approximately 15 gsm (grams per square meter, or g/m²) to approximately 500 gsm. In some embodiments, the basis weight ranges from between approximately 20 gsm to approximately 100 gsm. In some embodiments, the basis weight ranges from between approximately 100 gsm to approximately 200 gsm. In some embodiments, the basis weight ranges from approximately 200 gsm to approximately 300 gsm. In some embodiments, the basis weight of the separator ranges from between approximately 15 gsm to approximately 100 gsm. The basis weight or grammage is measured according to method number 3 "Grammage" of Battery Council International Standard BCIS-03A (2009 Rev.) "BCI Recommended test Methods VRLA-AGM Battery Separators."

In some embodiments, the thickness of the separator (i.e., from the outer end of the first peripheral fiber region to the outer end of the second peripheral fiber region) can vary. In some embodiments, the thickness of the separator can range from greater than zero to about 5 millimeters. The thickness of the separator can be greater than or equal to about 0.1 mm, about 0.5 mm, about 1.0 mm, about 1.5 mm, about 2.0 mm, about 2.5 mm, about 3.0 mm, about 3.5 mm, about 4.0 mm, or about 4.5 mm; and/or less than or equal to about 5.0 mm, about 4.5 mm, about 4.0 mm, about 3.5 mm, about 3 mm, about 2.5 mm, about 2.0 mm, about 1.5 mm, about 1.0 mm, or about 0.5 mm. In some embodiments, the thickness of the separator ranges from between about 0.1 mm to about 0.9 mm. The thickness is measured according to method number 12 "Thickness" of Battery Council International Standard BCIS-03A (2009 Rev.) "BCI Recommended test Methods VRLA-AGM Battery Separators." This method measures the thickness with a 1 square inch anvil load to a force of 10 kPa (1.5 psi).

In some embodiments, the porosity of the separator is at least 80%, at least 85%, at least 88%, or at least 90%. In some embodiments, the porosity of the separator ranges from 80% to 98%, from 85% to 97%, from 88% to 95%, or from 90% to 95%. The porosity is measured according to Battery Council International Battery Technical Manual BCIS-03A (Rev. February 02) ("Recommended Battery Materials Specifications: Valve Regulated Recombinant Batteries)", method number 6, "Standard Test Method for Volume Porosity of Recombinant Battery Separator Mats".

Separator Performance

As described in Examples 1 and 2, various separators of the invention were made and tested against appropriate controls.

As noted, a 3-region separator in which the middle region comprises about 1 to 50% by weight fibers having an average diameter from about 0.1 to less than 2 μm exhibits an improved tensile strength compared to a 3-region separator in which the middle region does not contain fibers having such average diameter. As discussed in Example 2.1 and shown in FIGS. 1 and 2, a separator of the invention containing fine fiber in the middle region exhibits increased tensile strength in both the machine direction (about 22 to about 40% increase) and the cross direction (about 15 to about 37% increase) compared to the control (Example 1.3: 3-region, no fine fiber or silica in the middle fiber region).

In some embodiments, the tensile strength (machine direction) of the separator is about 2.00 to about 2.40 lbs/inch, about 2.00 to about 2.35 lbs/inch, about 2.00 to about 2.30 lbs/inch, about 2.00 to about 2.25 lbs/inch, about 2.00 to about 2.20 lbs/inch, about 2.05 to about 2.40 lbs/inch, about 2.05 to about 2.35 lbs/inch, about 2.05 to about 2.30 lbs/inch, about 2.05 to about 2.25 lbs/inch, or about 2.05 to about 2.20 lbs/inch. The tensile strength is measured according to Battery Council International Battery Technical Manual BCIS-03A (Rev. February 02) ("Recommended Battery Materials Specifications: Valve Regulated Recombinant Batteries)", method number 13, "Standard Test Method for Tensile Strength and Percent Elongation Measurements on Recombinant Battery Separator Mat".

In some embodiments, the tensile strength (cross direction) of the separator is about 1.75 to about 2.20 lbs/inch, about 1.75 to about 2.15 lbs/inch, about 1.75 to about 2.10 lbs/inch, about 1.75 to about 2.05 lbs/inch, about 1.75 to about 2.00 lbs/inch, about 1.80 to about 2.20 lbs/inch, about 1.80 to about 2.15 lbs/inch, about 1.80 to about 2.10 lbs/inch, about 1.80 to about 2.05 lbs/inch, or about 1.80 to about 2.00 lbs/inch. The tensile strength is measured according to BCIS-03A (Rev. February 02), method number 13.

Figure 2:
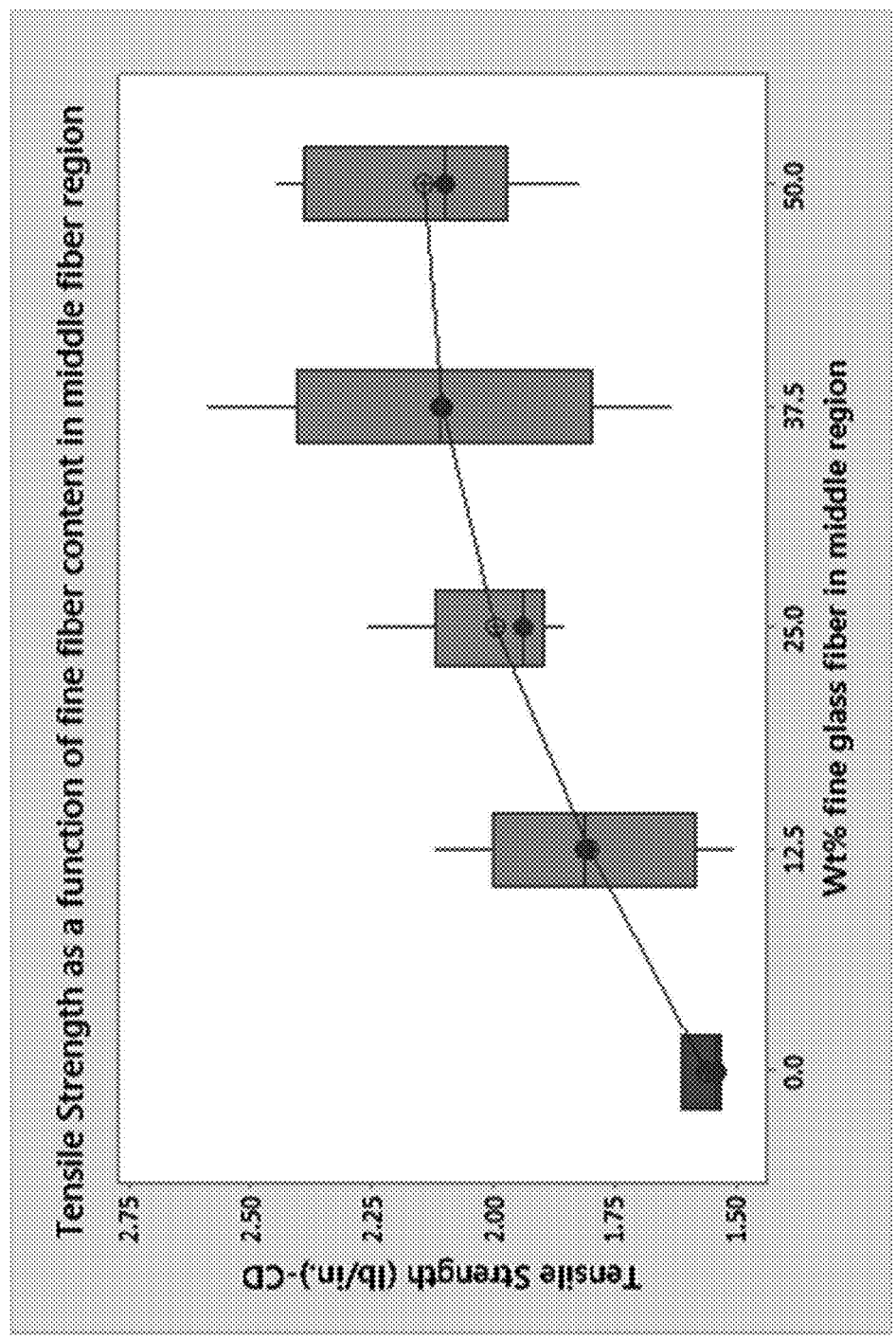
FIG. 2 shows how tensile strength of a 3-region separator varies in the cross direction based on the amount of fine fiber in the middle fiber region.
Figure 6:
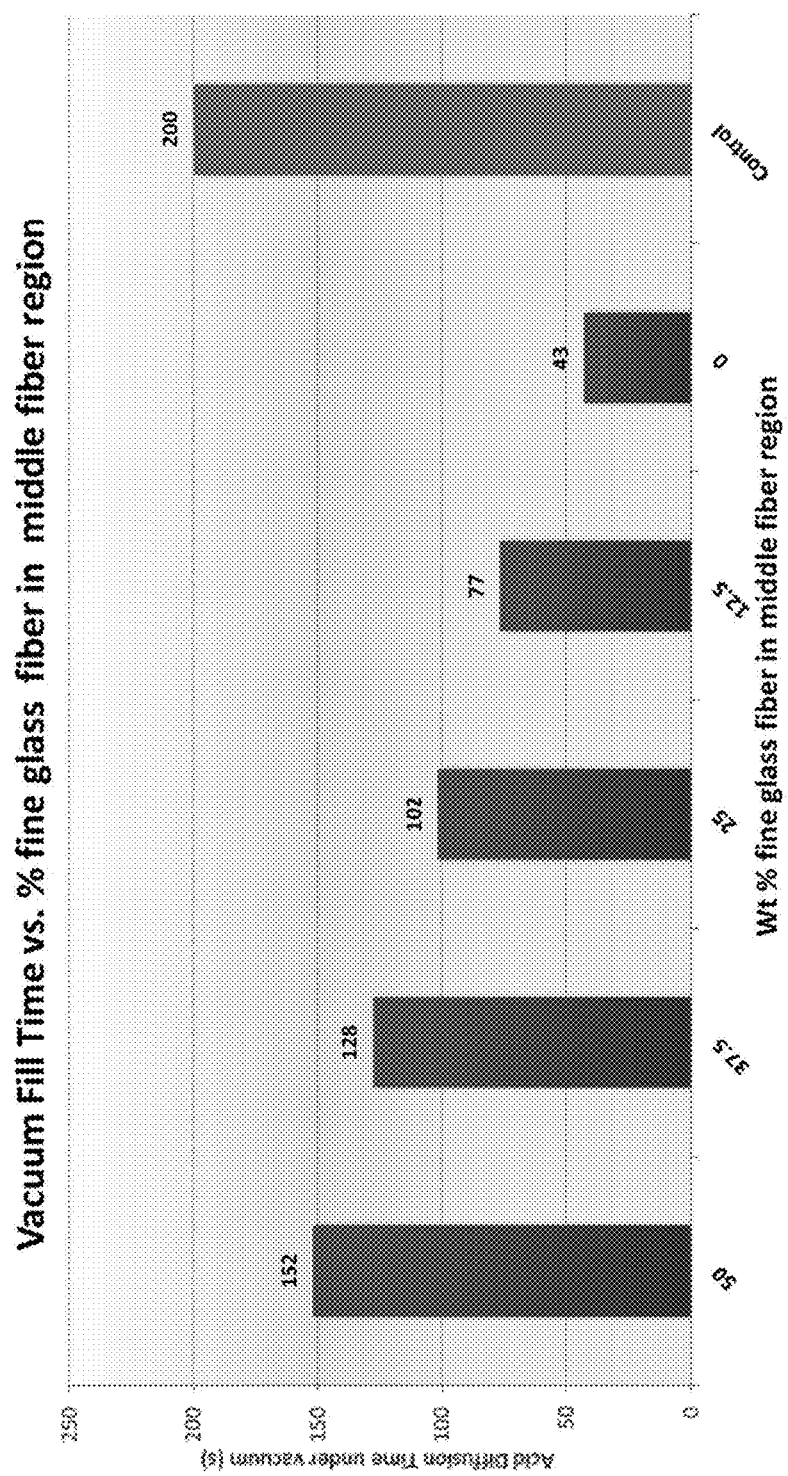
FIG. 6 shows how vacuum fill time for a 3-region separator varies based on the amount of fine fiber in the middle region.

As shown in FIGS. 1, 2 and 6, while the presence of fine fiber in the middle fiber region increases the acid filling time (also referred to as "acid filling speed", "vacuum fill time", "vacuum fill speed", etc., and used interchangeably throughout) compared to the 3-region separator having no fine fiber or silica in the middle fiber region, a separator of the invention exhibits an increased tensile strength by comparison, and yet still provides a faster acid filling time (measured as described in Example 2) compared to the control (Example 1.3: 3-region, no fine fiber or silica in the middle fiber region). In this way a separator of the invention exhibits a balance of improved properties.

In some embodiments, a separator exhibits an acid filling time of about 60 to about 155 seconds, and the tensile strength (machine direction) of the separator is about 2.00 to about 2.40 lbs/inch, about 2.00 to about 2.35 lbs/inch, about 2.05 to about 2.40 lbs/inch, or about 2.05 to about 2.35 lbs/inch. In some embodiments, a separator exhibits an acid filling time of about 75 to about 155 seconds, and the tensile strength (machine direction) of the separator is about 2.00 to about 2.40 lbs/inch, about 2.00 to about 2.35 lbs/inch, about 2.05 to about 2.40 lbs/inch, or about 2.05 to about 2.35 lbs/inch. In some embodiments, a separator exhibits an acid filling time of about 60 to about 130 seconds, and the tensile strength (machine direction) of the separator is about 2.00 to about 2.30 lbs/inch, about 2.00 to about 2.25 lbs/inch, about 2.05 to about 2.30 lbs/inch, or about 2.05 to about 2.25 lbs/inch. In some embodiments, a separator exhibits an acid filling time of about 75 to about 130 seconds, and the tensile strength (machine direction) of the separator is about 2.00 to about 2.30 lbs/inch, about 2.00 to about 2.25 lbs/inch, about 2.05 to about 2.30 lbs/inch, or about 2.05 to about 2.25 lbs/inch. In some embodiments, a separator exhibits an acid filling time of about 100 to about 155 seconds, and the tensile strength (machine direction) of the separator is 2.15 to about 2.40 lbs/inch, about 2.15 to about 2.35 lbs/inch, about 2.20 to about 2.40 lbs/inch, or about 2.20 to about 2.35 lbs/inch. The tensile strength is measured according to BCIS-03A (Rev. February 02), method number 13. The acid filling time is measured as described in Example 2.

In some embodiments, a separator exhibits an acid filling time of about 60 to about 155 seconds, and the tensile strength (cross direction) of the separator is about 1.75 to about 2.20 lbs/inch, about 1.75 to about 2.15 lbs/inch, about 1.80 to about 2.20 lbs/inch, or about 1.80 to about 2.15 lbs/inch. In some embodiments, a separator exhibits an acid filling time of about 75 to about 155 seconds, and the tensile strength (cross direction) of the separator is about 1.75 to about 2.20 lbs/inch, about 1.75 to about 2.15 lbs/inch, about 1.80 to about 2.20 lbs/inch, or about 1.80 to about 2.15 lbs/inch. In some embodiments, a separator exhibits an acid filling time of about 60 to about 130 seconds, and the tensile strength (cross direction) of the separator is about 1.75 to about 2.10 lbs/inch, about 1.75 to about 2.05 lbs/inch, about 1.80 to about 2.10 lbs/inch, or about 1.80 to about 2.05 lbs/inch. In some embodiments, a separator exhibits an acid filling time of about 75 to about 130 seconds, and the tensile strength (cross direction) of the separator is about 1.75 to about 2.10 lbs/inch, about 1.75 to about 2.05 lbs/inch, about 1.80 to about 2.10 lbs/inch, or about 1.80 to about 2.05 lbs/inch. In some embodiments, a separator exhibits an acid filling time of about 100 to about 155 seconds, and the tensile strength (cross direction) of the separator is about 2.00 to about 2.20 lbs/inch, about 2.00 to about 2.15 lbs/inch, about 1.95 to about 2.20 lbs/inch, or about 1.95 to about 2.15 lbs/inch. The tensile strength is measured according to BCIS-03A (Rev. February 02), method number 13. The acid filling time is measured as described in Example 2.

Figure 3:
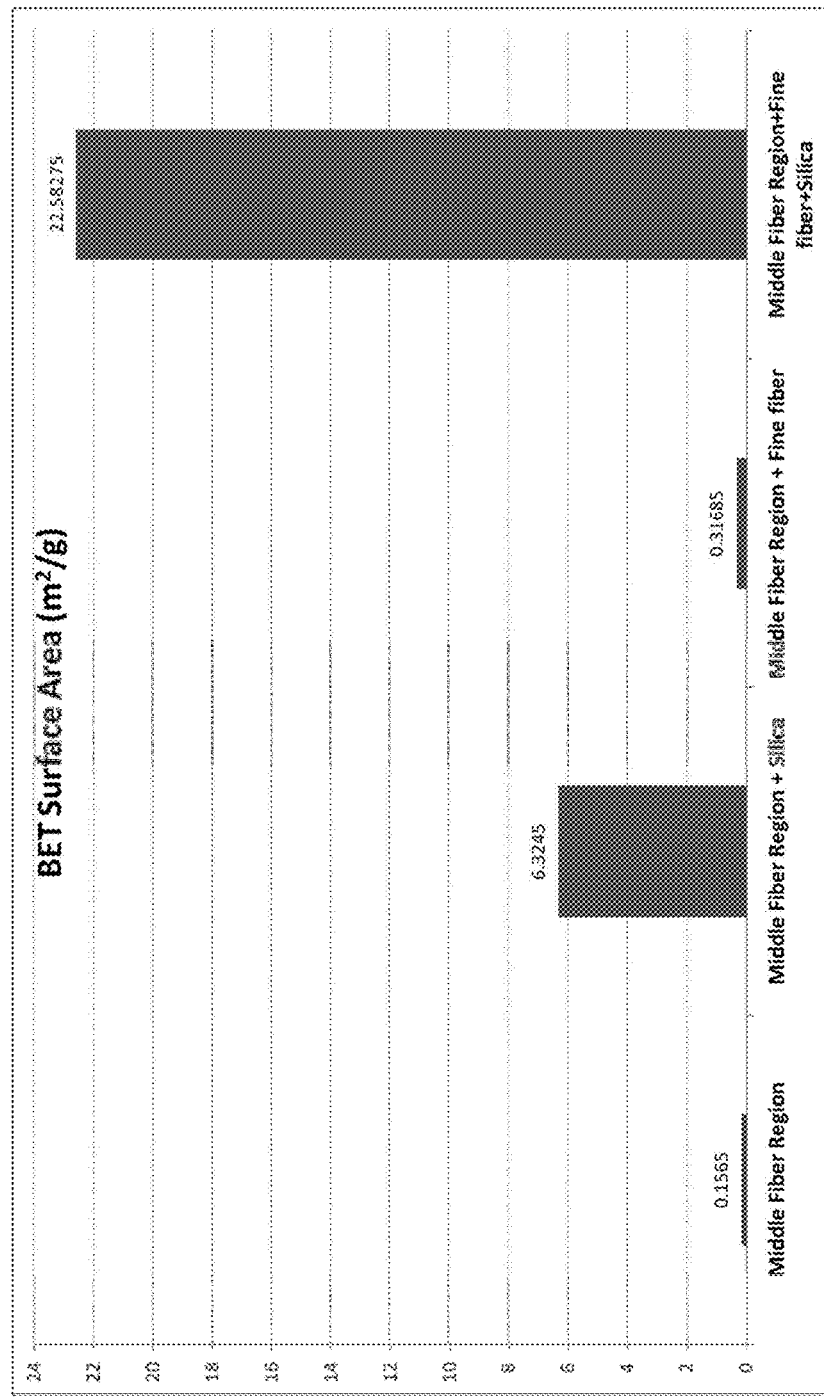
FIG. 3 shows how surface area of the middle region of a 3-region separator varies based on the presence of silica, fine fiber, or both silica and fine fiber in the middle fiber region.

As shown in FIG. 3, a separator of the invention containing silica in the middle region has increased surface area, measured according to BCIS-03A (2009 revision) method number 8, compared to the control (Example 1.3: 3-region, no fine fiber or silica in the middle fiber region). As shown, the increase is significantly greater when the separator contains both silica and fine fiber in the middle region. Without wishing to be bound by theory, it is believed that the fine fiber further improves the retention rate of the silica.

Figure 7:
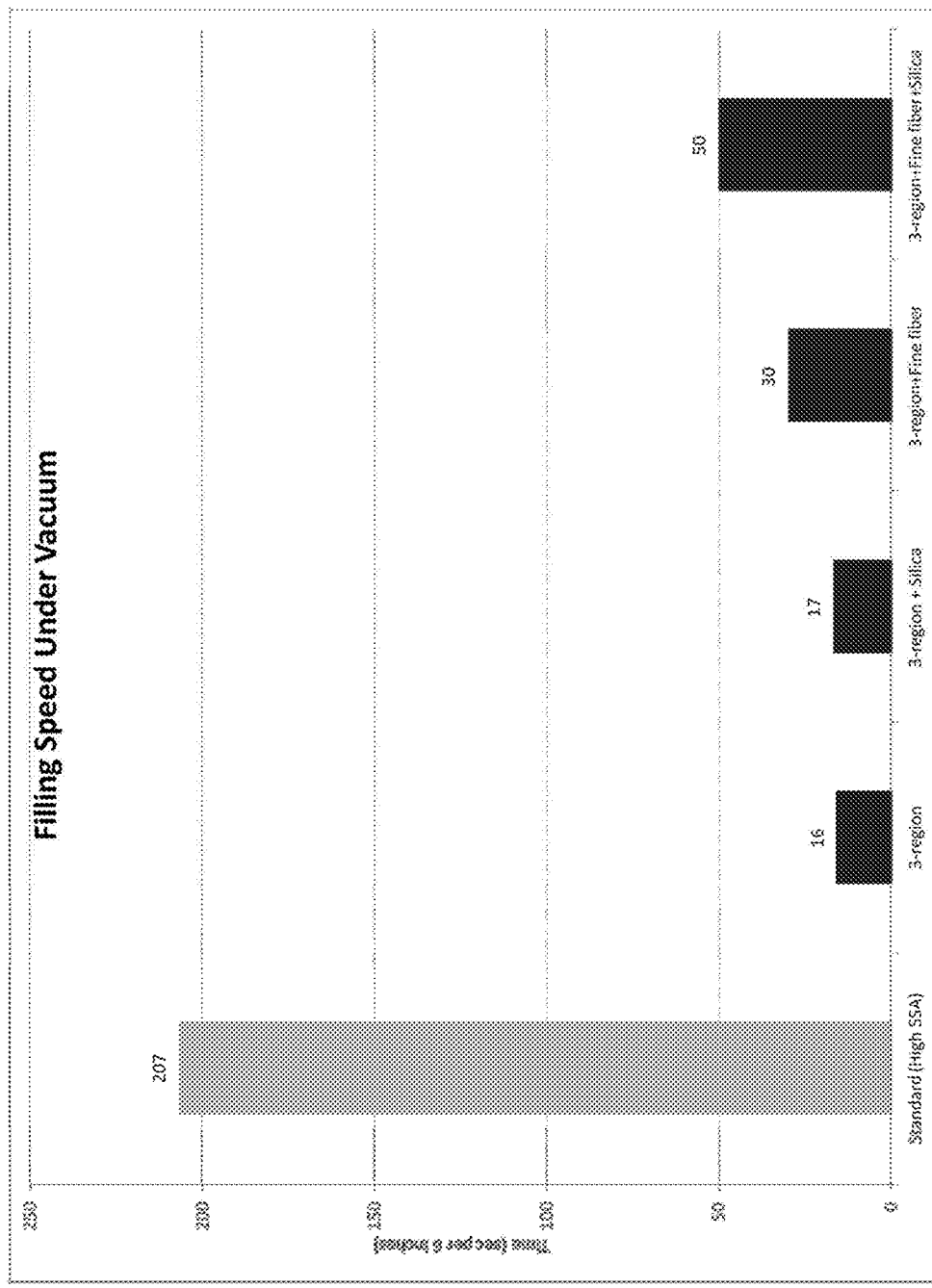
FIG. 7 shows how vacuum fill time for a 3-region separator varies based on the presence of silica, fine fiber, or both silica and fine fiber in the middle region.

As shown in FIGS. 3 and 7, while the presence of silica and/or fine fiber in the middle fiber region increases the acid filling time compared to the 3-region separator having no fine fiber or silica in the middle fiber region (Example 1.3), a separator of the invention exhibits an increased surface area by comparison, and yet still provides a faster acid filling time (measured as described in Example 2) compared to the control (Example 1.1: standard (high SSA)). In this way a separator of the invention exhibits a balance of improved properties.

In some embodiments in which the middle fiber region contains at least 1% by weight silica, a separator of the invention has a middle fiber region with a specific surface area from about 1 to about 10 m$^2$/g, about 1 to about 7 m$^2$/g, about 2 to about 10 m$^2$/g or about 2 to about 7 m$^2$/g, and an acid filling speed of about 17 to about 50, about 17 to about 40, about 17 to about 30, about 20 to about 50, about 20 to about 40, about 20 to about 30, about 25 to about 50, or about 25 to about 40 seconds (per 6 inches). The specific surface area is measured using BET as described above, and the acid filling speed is measured as described in Example 2.

In some embodiments in which the middle fiber region contains both fine fibers and at least 1% by weight silica, a separator of the invention has a middle fiber region with a specific surface area from about 2 to about 30 m$^2$/g, about 2 to about 25 m$^2$/g, about 3 to about 30 m$^2$/g, about 3 to about 25 m$^2$/g, about 5 to about 30 m$^2$/g, about 5 to about 25 m$^2$/g, about 10 to about 30 m$^2$/g or about 10 to about 25 m$^2$/g, and an acid filling speed of about 35 to about 80, about 35 to about 70, about 35 to about 60, about 35 to about 50, about 40 to about 80, about 40 to about 70, about 40 to about 60, or about 40 to about 50 seconds (per 6 inches). The specific surface area is measured using BET as described above, and the acid filling speed is measured as described in Example 2.

Figure 4:
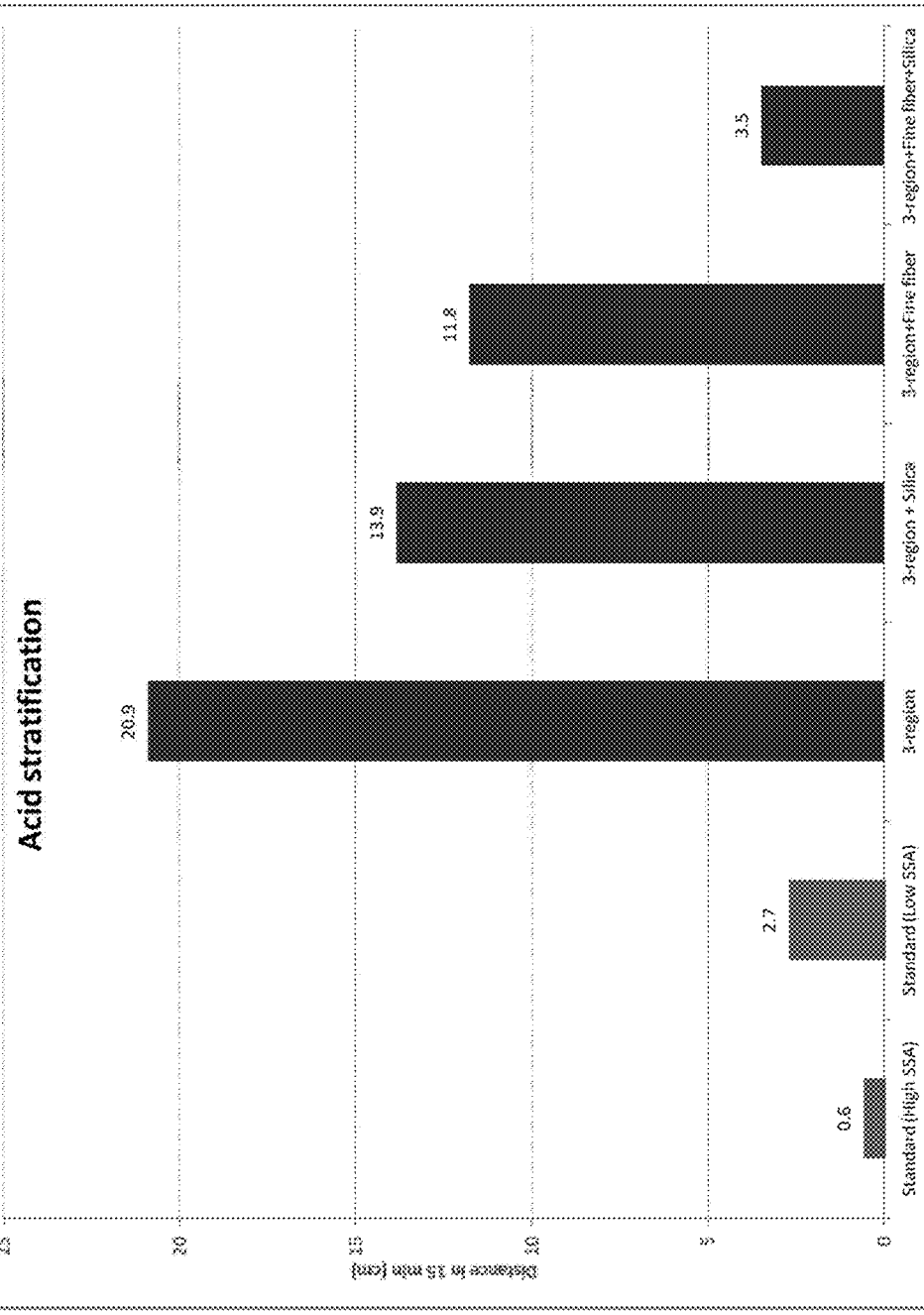
FIG. 4 shows how acid stratification in a 3-region separator varies based on the presence of silica, fine fiber, or both silica and fine fiber in the middle fiber region.

As shown in FIG. 4, a separator of the invention containing silica, fine fiber or both silica and fine fiber in the middle region exhibits increased resistance to acid stratification, measured as described in Example 2 (compressed density 240 g/m$^2$/mm), compared to the control (Example 1.3: 3-region, no fine fiber or silica in the middle fiber region). As shown, the increase is significantly greater when the separator contains both silica and fine fiber in the middle region.

As shown in FIGS. 4 and 7, while the presence of silica and/or fine fiber in the middle fiber region increases the acid filling time compared to the 3-region separator having no fine fiber or silica in the middle fiber region (Example 1.3), a separator of the invention exhibits an increased resistance to acid stratification, measured as described in Example 2 (compressed density 240 g/m$^2$/mm), and yet still provides a faster acid filling time (measured as described in Example 2) compared to the control (Example 1.1: standard (high SSA)). In this way a separator of the invention exhibits a balance of improved properties.

In some embodiments, a separator of the invention has an acid stratification distance from about 2.5 to about 16 cm, about 3.0 to about 16 cm, about 3.5 to about 16 cm, or about 3.5 to about 14 cm, and an acid filling speed of about 17 to about 50, about 17 to about 40, about 17 to about 30, about 20 to about 50, about 20 to about 40, about 20 to about 30, about 25 to about 50, or about 25 to about 40 seconds (per 6 inches). Acid stratification distance and acid filling speed are each measured as described in Example 2.

Processes

Making a Separator—Generally

A separator of the invention can be produced using a wet laid or a dry laid process. In general, a wet laid process involves mixing together the fibers; for example, glass fibers (e.g., chopped strand and/or microglass) may be mixed together, optionally with any synthetic fibers, to provide a glass fiber slurry. In some cases, the slurry is an aqueous-based slurry. In certain embodiments, the microglass fibers, and optionally any chopped strand and/or synthetic fibers, are stored separately in various holding tanks prior to being mixed together. These fibers may be processed through a pulper before being mixed together. In some embodiments, combinations of chopped strand glass fibers, microglass fibers, and/or synthetic fibers are processed through a pulper and/or a holding tank prior to being mixed together. As discussed above, microglass fibers may include fine microglass fibers and coarse microglass fibers.

It should be appreciated that any suitable method for creating a glass fiber slurry may be used. In some cases, additional additives are added to the slurry to facilitate processing. The temperature may also be adjusted to a suitable range, for example, between 33° F./0.6° C. and 100° F./38° C. (e.g., between 50° F./10° C. and 85° F./29° C.). In some embodiments, the temperature of the slurry is maintained. In some cases, the temperature is not actively adjusted.

In some embodiments, the wet laid process uses similar equipment as a conventional papermaking process, which includes a hydropulper, a former or a headbox, a dryer, and an optional converter. For example, the slurry may be prepared in one or more pulpers. After appropriately mixing the slurry in a pulper, the slurry may be pumped into a headbox, where the slurry may or may not be combined with other slurries or additives may or may not be added. The slurry may also be diluted with additional water such that the final concentration of fiber is in a suitable range, such as for example, between about 0.1% to 0.5% by weight.

In some cases, the pH of the glass fiber slurry may be adjusted as desired. For instance, the pH of the glass fiber slurry may range between about 1.5 and about 4.5, or between about 2.6 and about 3.2.

Before the slurry is sent to a headbox, the slurry may be passed through centrifugal cleaners for removing unfiberized glass or shot. The slurry may or may not be passed through additional equipment such as refiners or deflakers to further enhance the dispersion of the fibers. Fibers may then be collected on a screen or wire at an appropriate rate using any suitable machine, e.g., a fourdrinier, a rotoformer, a cylinder, an inclined wire fourdrinier, a gap former, a twin wire, a multiply former, a pressure former, a top former, etc.).

In some embodiments, the process involves introducing binder (and/or other components) into a pre-formed glass fiber layer. In some embodiments, as the glass fiber layer is passed along an appropriate screen or wire, different components included in the binder, which may be in the form of separate emulsions, are added to the glass fiber layer using a suitable technique. In some cases, each component of the binder resin is mixed as an emulsion prior to being combined with the other components and/or glass fiber layer. In some embodiments, the components included in the binder may be pulled through the glass fiber layer using, for example, gravity and/or vacuum. In some embodiments, one or more of the components included in the binder resin may be diluted with softened water and pumped into the glass fiber layer.

In other embodiments, a dry laid process is used. In a dry laid process, glass fibers are chopped and dispersed in air that is blown onto a conveyor, and a binder is then applied. Dry laid processing is typically more suitable for the production of highly porous media including bundles of glass fibers. In some embodiments, when the middle fiber region is produced separately (to be laminated to the first and second peripheral fiber regions), the middle fiber region is produced using a dry laid process.

Any number of intermediate processes (e.g., pressing, calendering, laminating, etc.) and addition of additives may be utilized throughout the separator formation process. The silica of the middle region, when present, can be added either to the slurry or to the separator as it is being formed. In some embodiments, the silica of the middle region, when present, is added to the slurry. Additives can also be added either to the slurry or to the separator as it is being formed, including salts, fillers including binders and latex. In some embodiments, the additives may comprise between about 0% to about 30% by weight of the separator. During the separator forming process, various pH values may be utilized for the slurries. Depending on the glass composition, the pH value may range from approximately 2 to approximately 4. Furthermore, the drying temperature may vary, also depending on the fiber composition. In various embodiments, the drying temperature may range from approximately 100° C. to approximately 700° C. The separator may comprise more than one layer, each layer optionally comprising different types of fibers with different physical and chemical characteristics.

Multi-Phase Process

A multi-phase process may be used to make two or three regions of a separator as a composite article. As an example, a three-region separator or a two-region portion thereof may be prepared by a wet laid process where a first fiber slurry (e.g., glass fibers in an aqueous solvent such as water) is applied onto a wire conveyor to form a first layer. A second fiber slurry comprising fibers (e.g., glass fibers in an aqueous solvent such as water) is then applied onto the first layer. Vacuum may be continuously applied to the first and second slurries during the above process to remove solvent from the fibers, resulting in the simultaneous formation of the first and second fiber regions into a composite article. The composite article is then dried. Due to this fabrication process, at least a portion of the fibers in the first region can be intermingled with at least a portion of the fibers from the second region (e.g., at the interface between the two layers), to form a transition zone. A third region can also be formed and added using a similar process or a different process such as lamination, co-pleating, or collation (i.e., placed directly adjacent one another and kept together by pressure). For example, in some cases, two layers are formed into a composite article by a wet laid process in which separate fiber slurries are laid one on top of the other as water is drawn out of the slurry, and the composite article is then combined with a third layer by any suitable process (e.g., lamination, co-pleating, or collation).

Thus, in one aspect the invention relates to a battery separator, comprising: a middle fiber region; a first peripheral fiber region; and a second peripheral fiber region; wherein the middle fiber region is disposed between the first peripheral fiber region and the second peripheral fiber region; and wherein the thickness of the middle fiber region constitutes 1-49% of the total fiber region thickness; wherein the first peripheral fiber region and at least a portion of the middle fiber region is produced by a process comprising: (a) providing a first slurry of glass fibers having an average diameter from about 0.1 to about 2 µm; (b) laying down the first slurry on a wire of a papermaking machine; (c) providing a second slurry of (i) fibers having an average diameter from 2 to about 50 µm, and (ii) fibers having an average diameter from about 0.1 to less than 2 µm and/or silica; provided that the average diameter of the fibers of the second slurry is larger than the average diameter of the fibers of the first slurry; (d) laying down the second slurry on top of the first slurry; and (e) dewatering the first and second slurries to form a 2-layer structure comprising the first peripheral fiber region and at least a portion of the middle fiber region; such that the middle fiber region comprises: fibers having an average diameter from 2 to about 50 µm, and (i) from about 1 to 50% by weight fibers having an average diameter from about 0.1 to less than 2 µm, or (ii) from about 1 to about 40% by weight silica, or (iii) from about 1 to about 40% by weight fibers having an average diameter from about 0.1 to less than 2 µm, and from about 1 to about 20% by weight silica.

The multi-phase process can also include the use of one or more lamellas and more than one flow zone. For example, a system used to make the separator (e.g., a papermaking machine) can include flow distributors (e.g., headboxes) configured to dispense one or more fiber slurries into a flow zone positioned downstream of the one or more flow distributors. In some embodiments, a single flow distributor is present. In other embodiments, two or more flow distributors can be present (e.g., for introducing two or more fiber slurries into the system) In some embodiments, a distributor block can be positioned between the one or more flow distributors and the flow zone. The distributor block may help to evenly distribute the one or more fiber slurries across the width of the flow zone upon the slurry(ies) entering the flow zone. Different types of distributor blocks are known in the art and can be used in the processes described herein.

A system used to make a separator of the invention (e.g., a papermaking machine) can include a lamella positioned in the flow zone. The lamella may be used as a partition to divide the flow zone into a lower portion and an upper portion (or into additional portions when multiple lamellas are present). In certain embodiments, the lamella can be used to separate a first fiber slurry flowing in the lower portion of the flow zone from a second fiber slurry flowing in the upper portion of the flow zone. For example, a first fiber slurry dispensed from a first flow distributor into the lower portion of the flow zone may be separated from a second fiber slurry dispensed from a second flow distributor into the upper portion of the flow zone until the mixtures reach a downstream end of the lamella, after which the first and second fiber slurries are allowed to meet. The first and second fiber slurries generally flow in the lower and upper portions of the flow zone in a downstream direction.

As described above, a lamella may be positioned in the flow zone to partition the flow zone into at least an upper portion and a bottom portion. A single lamella can be used, or the flow zone can include more than one lamella for separating three or more fiber slurries. In some such embodiments, the flow zone can be separated into three, four, or more distinct portions, each of which can contain a different fiber slurry or the same fiber slurry. The lamella can be positioned in any suitable position within the flow zone, and can vary depending on relative volumes of the fiber slurries in the upper and lower portions of the flow zone. For example, the lamella can be positioned at the center of a distributor block to allow substantially equal volumes and/or flow velocities of the fiber slurries in each of the upper and lower portions of the flow zone, while in other embodiments the lamella can be positioned higher or lower with respect to the distributor block to allow a larger or smaller portion of one fiber slurry in the flow zone relative to the other. Furthermore, the lamella can be positioned at a slight decline with respect to the horizontal, or the lamella can be substantially horizontal, or positioned at an incline with respect to the horizontal. Other positions of the lamella in the flow zone are also possible.

A lamella can be attached to a portion of a system for forming the separator using any suitable attachment technique. In some embodiments, a lamella is attached directly to a distributor block. In other embodiments, a lamella is attached to a threaded rod positioned vertically within a portion of the flow zone. In certain embodiments, attachment involves the use of adhesives, fasteners, metallic banding systems, railing mechanisms, or other support mechanisms. Other attachment mechanisms are also possible.

Forming the Three-region Separator

Any and all means of forming a middle fiber region disposed between two peripheral fiber regions are contemplated to be within the scope of the invention. For example, two fiber regions can be disposed adjacent to each other as the result of a multi-phase process, such as that described above, in which the division of the regions is considered to be at the midpoint of the transition zone. As discussed below, the midpoint of the transition zone is the midpoint of the density differential between the two regions. The density differential can be determined by measuring the density gradient profile in the thicknesswise direction. Any suitable technique may be used to measure the density gradient profile. One such method uses a QTRS Tree ring scanner and data analyzer model no. QTRS-01X (Quintek Measurement Systems, Knoxville, Tenn.).

When a battery separator is made using a multi-phase forming process, the forming process causes fibers on the top phase to migrate and intermingle with fibers on the bottom phase, creating a transition zone. The apparent density of this zone may vary across the zone.

Figure 9:
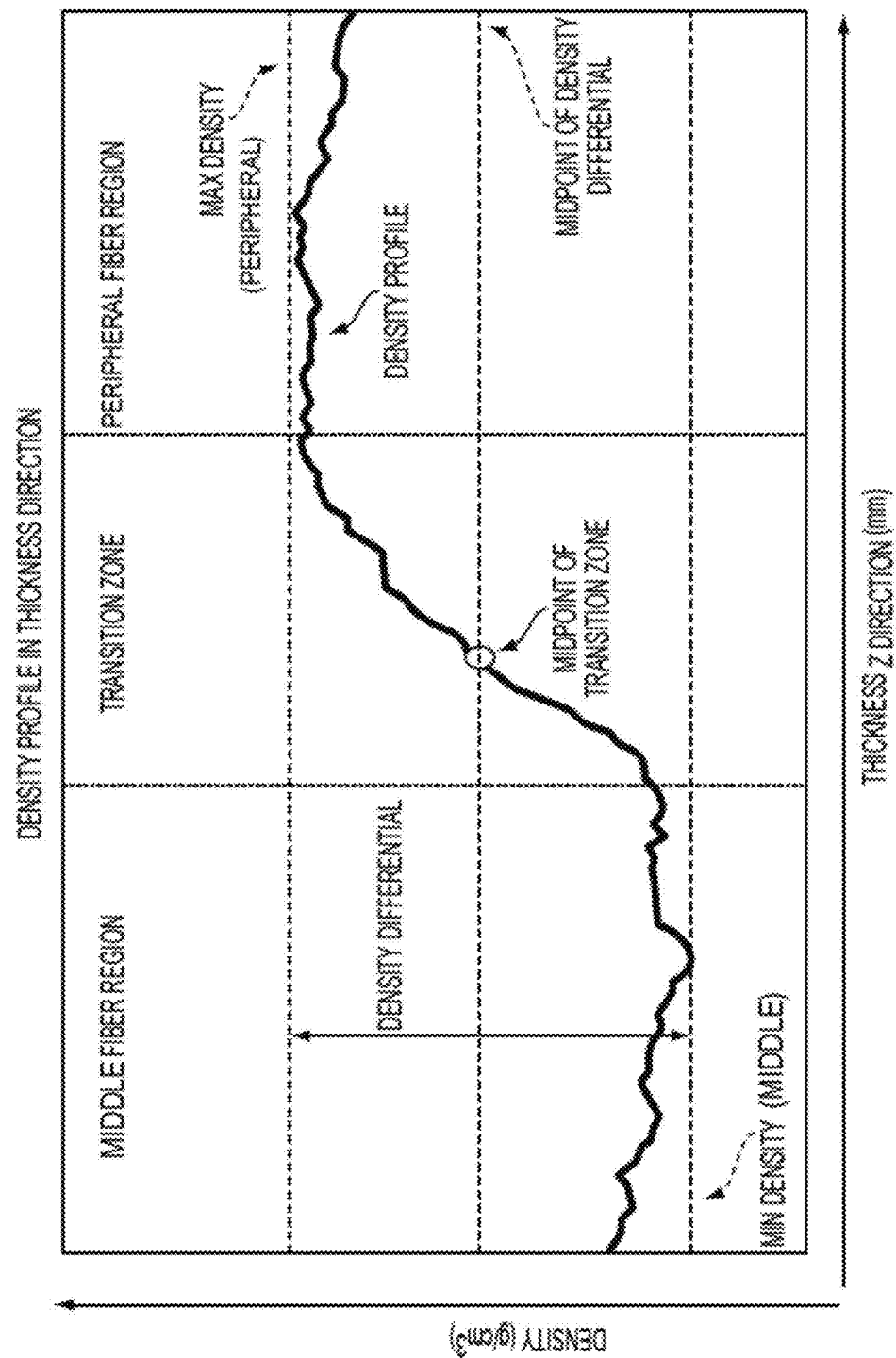
FIG. 9 shows an exemplary density profile of two adjacent regions of a 3-region separator formed in a multi-phase papermaking process.

The apparent density (referred to as "density" herein) of a separator is measured as the grammage of the separator in $g/m^2$ per unit thickness of the separator (e.g., in gsm/mm). If the density of a separator is profiled in the thickness direction (normal to the surface of the separator), a gradient in density may be observed. This gradient indicates that the density of the separator decreases across the density profile from a region with fibers having a comparatively lower average diameter (i.e., a peripheral fiber region) to a region with fibers having a comparatively higher average diameter (i.e., the middle fiber region) because the total void volume in the middle fiber region is larger than that of the peripheral fiber region. In the transition zone, across the density profile from peripheral fiber region to middle fiber region, the density decreases from the peripheral fiber region to the middle fiber region. The density gradient created as a result, can be measured as described above. Referring to the density profile data obtained, the region where the density starts to change from one region to the adjacent region is considered the transition zone. The midpoint of the density differential between one region and the adjacent region is the midpoint of the transition zone. An exemplary density profile and identification of the midpoint of the transition zone between two adjacent regions of a separator formed in a multi-phase papermaking process is shown in FIG. 9. The change in density of the separator across the middle fiber region, through the transition zone, and across the peripheral fiber region is shown. As illustrated in FIG. 9, the density differential is the difference between the minimum density in the middle fiber region and the maximum density in the peripheral fiber region. The point at which the density profile reaches the midpoint of this differential (i.e., the density value that is half-way between them) is the midpoint of the transition zone. The location on the thickness axis having the density of the midpoint of the transition zone defines the end of each of the two fiber regions.

Alternatively, two separately-formed fiber regions can be laminated to each other, in which case each of the regions may appear to be a discrete layer. Combinations of a multi-phase process formation and lamination which result in the middle fiber region being disposed between the first peripheral fiber region and second peripheral fiber region, wherein the thickness of the middle fiber region constitutes 1-49% of the sum of the thicknesses of the middle fiber region, the first peripheral fiber region and the second peripheral fiber region are contemplated to be within the scope of the invention.

In some embodiments, the separator is made by a multi-phase process, in which there is a first transition zone between the first peripheral fiber region and the middle fiber region, and there is a second transition zone between the middle fiber region and the second peripheral fiber region. This embodiment is illustrated in FIG. 10A, in which a wavy line separating two regions indicates that there is a transition zone between the two regions. For this embodiment, in the multi-phase process described above, each "layer" formed is a fiber region of the separator.

Thus, in one aspect the invention relates to a battery separator, comprising: a middle fiber region; a first peripheral fiber region; and a second peripheral fiber region; wherein the middle fiber region is disposed between the first peripheral fiber region and the second peripheral fiber region; and wherein the thickness of the middle fiber region constitutes 1-49% of the total fiber region thickness; wherein the battery separator is produced by a process comprising: (a) providing a first slurry of glass fibers having an average diameter from about 0.1 to about 2 μm; (b) laying down the first slurry on a wire of a papermaking machine; (c) providing a second slurry of (i) fibers having an average diameter from 2 to about 50 μm, and (ii) fibers having an average diameter from about 0.1 to less than 2 μm and/or silica; provided that the average diameter of the fibers of the second slurry is larger than the average diameter of the fibers of the first slurry; (d) laying down the second slurry on top of the first slurry; (e) providing a third slurry of glass fibers having an average diameter from about 0.1 to about 2 μm; provided that the average diameter of the fibers of the third slurry is smaller than the average diameter of the fibers of the second slurry; (f) laying down the third slurry on top of the second slurry; and (g) dewatering the first, second and third slurries to form the separator; such that the middle fiber region comprises: fibers having an average diameter from 2 to about 50 μm, and (i) from about 1 to 50% by weight fibers having an average diameter from about 0.1 to less than 2 μm, or (ii) from about 1 to about 40% by weight silica, or (iii) from about 1 to about 40% by weight fibers having an average diameter from about 0.1 to less than 2 μm, and from about 1 to about 20% by weight silica.

In one aspect the invention relates to a process for forming a battery separator, comprising: a middle fiber region; a first peripheral fiber region; and a second peripheral fiber region; wherein the middle fiber region is disposed between the first peripheral fiber region and the second peripheral fiber region; the process comprising: (a) providing a first slurry of glass fibers having an average diameter from about 0.1 to about 2 μm; (b) laying down the first slurry on a wire of a papermaking machine; (c) providing a second slurry of (i) fibers having an average diameter from 2 to about 50 μm, and (ii) fibers having an average diameter from about 0.1 to less than 2 μm and/or silica; provided that the average diameter of the fibers of the second slurry is larger than the average diameter of the fibers of the first slurry; (d) laying down the second slurry on top of the first slurry; (e) providing a third slurry of glass fibers having an average diameter from about 0.1 to about 2 μm; provided that the average diameter of the fibers of the third slurry is smaller than the average diameter of the fibers of the second slurry; (f) laying down the third slurry on top of the second slurry; and (g) dewatering the first, second and third slurries to form the separator, such that the thickness of the middle fiber region constitutes 1-49% of the sum of the thicknesses of the middle fiber region and the first and second peripheral fiber regions; such that the middle fiber region comprises: fibers having an average diameter from 2 to about 50 μm, and (i) from about 1 to 50% by weight fibers having an average diameter from about 0.1 to less than 2 μm, or (ii) from about 1 to about 40% by weight silica, or (iii) from about 1 to about 40% by weight fibers having an average diameter from about 0.1 to less than 2 μm, and from about 1 to about 20% by weight silica.

In some embodiments, the separator is made by separately forming a middle fiber layer, a first peripheral fiber layer and a second peripheral fiber layer, and laminating the middle fiber layer to each of the peripheral fiber layers. This embodiment is illustrated in FIG. 10B, in which a dashed line separating two regions indicates that the two regions have been separately formed and then joined together, so that there is no transition zone.

In some embodiments, the separator is made by separately forming a first layer comprising a first peripheral fiber region; separately forming a second layer comprising a middle fiber region and a second peripheral fiber region by a multi-phase process, in which there is a transition zone between the middle fiber region and the second peripheral fiber region; and laminating the two layers together. This embodiment is illustrated in FIG. 10C, in which a dashed line separating two regions indicates that the two regions have been separately formed and then joined together, so that there is no transition zone; and a wavy line separating two regions indicates that there is a transition zone between the two regions. For this embodiment, in the multi-phase process described above, each "layer" formed is a fiber region of the separator.

Thus, in one aspect the invention relates to a battery separator, comprising: a middle fiber region; a first peripheral fiber region; and a second peripheral fiber region; wherein the middle fiber region is disposed between the first peripheral fiber region and the second peripheral fiber region; and wherein the thickness of the middle fiber region constitutes 1-49% of the total fiber region thickness; wherein the battery separator is produced by a process comprising: (a) providing a first slurry of glass fibers having an average diameter from about 0.1 to about 2 μm; (b) laying down the first slurry on a wire of a papermaking machine; (c) providing a second slurry of (i) fibers having an average diameter from 2 to about 50 μm, and (ii) fibers having an average diameter from about 0.1 to less than 2 μm and/or silica; provided that the average diameter of the fibers of the second slurry is larger than the average diameter of the fibers of the first slurry; (d) laying down the second slurry on top of the first slurry; (e) dewatering the first and second slurries to form a 2-layer structure comprising the first peripheral fiber region and the middle fiber region; (f) providing a fiber mat comprising glass fibers having an average diameter from about 0.1 to about 2 μm; provided that the average diameter of the fibers of the second slurry is larger than the average diameter of the fibers of the fiber mat; and (g) laminating the 2-layer structure formed in step (e) to the fiber mat to form the separator, wherein the 2-layer structure comprises the first peripheral fiber region and the middle region, and the fiber mat comprises the second peripheral fiber region; such that the middle fiber region comprises: fibers having an average diameter from 2 to about 50 μm, and (i) from about 1 to 50% by weight fibers having an average diameter from about 0.1 to less than 2 μm, or (ii) from about 1 to about 40% by weight silica, or (iii) from about 1 to about 40% by weight fibers having an average diameter from about 0.1 to less than 2 μm, and from about 1 to about 20% by weight silica.

In one aspect the invention relates to a process for forming a battery separator comprising: a middle fiber region; a first peripheral fiber region; and a second peripheral fiber region; wherein the middle fiber region is disposed between the first peripheral fiber region and the second peripheral fiber region; the process comprising: (a) providing a first slurry of glass fibers having an average diameter from about 0.1 to about 2 μm; (b) laying down the first slurry on a wire of a papermaking machine; (c) providing a second slurry of (i) fibers having an average diameter from about 2 to about 50 μm, and (ii) fibers having an average diameter from about 0.1 to less than 2 μm and/or silica; provided that the average diameter of the fibers of the second slurry is larger than the average diameter of the fibers of the first slurry; (d) laying down the second slurry on top of the first slurry; (e) dewatering the first and second slurries to form a 2-layer structure; (f) providing a fiber mat comprising glass fibers having an average diameter from about 0.1 to about 2 μm; provided that the average diameter of the fibers of the second slurry is larger than the average diameter of the fibers of the fiber mat; and (g) laminating the 2-layer structure formed in step (e) to the fiber mat to form the separator, wherein the 2-layer structure comprises the first peripheral fiber region and the middle fiber region, and the fiber mat comprises the second peripheral fiber region, such that the thickness of the middle fiber region constitutes 1-49% of the sum of the thicknesses of the middle fiber region and the first and second peripheral fiber regions; such that the middle fiber region comprises: fibers having an average diameter from 2 to about 50 μm, and (i) from about 1 to 50% by weight fibers having an average diameter from about 0.1 to less than 2 μm, or (ii) from about 1 to about 40% by weight silica, or (iii) from about 1 to about 40% by weight fibers having an average diameter from about 0.1 to less than 2 μm, and from about 1 to about 20% by weight silica.

In some embodiments, the separator can be made by separately forming a first layer comprising a first peripheral fiber region and a middle fiber region by a multi-phase process, in which there is a first transition zone between the first peripheral fiber region and the middle fiber region; separately forming a second layer comprising a middle fiber region and a second peripheral fiber region by a multi-phase process, in which there is a second transition zone between the middle fiber region and the second peripheral fiber region; and laminating the two layers together such that the two separately formed middle fiber regions laminated together make up a single middle fiber region of the separator. This embodiment is illustrated in FIG. 10D, in which a dashed line separating two regions indicates that the two regions have been separately formed and then joined together, so that there is no transition zone; and a wavy line separating two regions indicates that there is a transition zone between the two regions. For this embodiment, in the multi-phase process described above, each fine "layer" formed is a peripheral fiber region of the separator, while the two middle "layers" are combined to form the middle fiber region.

Thus, in one aspect the invention relates to a battery separator, comprising: a middle fiber region; a first peripheral fiber region; and a second peripheral fiber region; wherein the middle fiber region is disposed between the first peripheral fiber region and the second peripheral fiber region; and wherein the thickness of the middle fiber region constitutes 1-49% of the total fiber region thickness; wherein the battery separator is produced by a process comprising: (a) providing a first slurry of glass fibers having an average diameter from about 0.1 to about 2 μm; (b) laying down the first slurry on a wire of a papermaking machine; (c) providing a second slurry of (i) fibers having an average diameter from 2 to about 50 μm, and (ii) fibers having an average diameter from about 0.1 to less than 2 μm and/or silica; provided that the average diameter of the fibers of the second slurry is larger than the average diameter of the fibers of the first slurry; (d) laying down the second slurry on top of the first slurry; (e) dewatering the first and second slurries to form a first 2-layer structure comprising the first peripheral fiber region and a portion of the middle fiber region; (f) providing a third slurry of glass fibers having an average diameter from about 0.1 to about 2 μm; (g) laying down the third slurry on a wire of a papermaking machine (separate from the first and second slurries); (h) providing a fourth slurry of (I) fibers having an average diameter from 2 to about 50 μm, and (II) fibers having an average diameter from about 0.1 to less than 2 μm and/or silica; provided that the average diameter of the fibers of the fourth slurry is larger than the average diameter of the fibers of the third slurry; (i) laying down the fourth slurry on top of the third slurry; (j) dewatering the third and fourth slurries to form a second 2-layer structure comprising the second peripheral fiber region and a portion of the middle fiber region; and (k) laminating the first 2-layer structure to the second 2-layer structure to form the separator; such that the middle fiber region comprises: fibers having an average diameter from 2 to about 50 μm, and (I) from about 1 to 50% by weight fibers having an average diameter from about 0.1 to less than 2 μm, or (II) from about 1 to about 40% by weight silica, or (III) from about 1 to about 40% by weight fibers having an average diameter from about 0.1 to less than 2 μm, and from about 1 to about 20% by weight silica.

Composition

In one aspect, the invention relates to a battery separator, comprising: a fiber region; and either (a) a silica-containing region adjacent to the fiber region, or (b) a first silica-containing region and a second silica-containing region, wherein the fiber region is disposed between the first silica-containing region and the second silica-containing region; wherein the fiber region and each silica-containing region contains fibers having an average diameter from about 2 to about 25 μm; wherein the fiber region contains less than 2% (including 0%) by weight silica; wherein each silica-containing region independently contains greater than or equal to 2% by weight silica. In some embodiments, each silica-containing region independently contains 2 to about 30% by weight silica. In some embodiments, the thickness of the fiber region constitutes greater than or equal to 25% of the total separator thickness, and the thickness of the silica-containing region(s) constitutes greater than or equal to 30% of the total separator thickness. In some embodiments, each silica-containing region independently contains about 5 to about 15% by weight silica.

As used herein in respect to such a separator, "total separator thickness" refers to the sum of the thickness of the fiber region and the thickness of the silica-containing region(s). The "thickness of the silica-containing region(s)" refers to the thickness of the (one) silica-containing region, or the sum of the thicknesses of the first silica-containing region and the second silica-containing region, as applicable.

The thickness of each region can be measured using any method described above, such as scanning electron microscopy (e.g., when two regions are laminated together), or by measuring the density gradient profile (e.g., when a multi-phase process is used). A silica-containing region will have a higher density than the fiber region.

The silica of the silica-containing region(s) can be precipitated silica, colloidal silica and/or fumed silica. The silica has a surface area of at least 50 $m^2/g$, e.g., from about 300 $m^2/g$ to about 510 $m^2/g$, or from about 400 to about 510 $m^2/g$. The average particle size of the silica can be from about 0.001 to about 20 μm, e.g., from about 1 to about 20

μm, from about 10 to about 20 μm, from about 2 to about 15 μm, or from about 7.5 to about 16 μm. In some embodiments, the silica is precipitated silica. In some embodiments, the silica is fumed silica.

In some embodiments, the silica is precipitated silica having a surface area from about 50 to about 750 m$^2$/g, about 100 to about 700 m$^2$/g, about 150 to about 650 m$^2$/g, about 200 to about 600 m$^2$/g, about 250 to about 550 m$^2$/g, about 300 to about 550 m$^2$/g, about 300 to about 510 m$^2$/g, about 350 to about 510 m$^2$/g, or about 400 to about 510 m$^2$/g. In some embodiments, the silica is precipitated silica having an average particle size from about 0.001 to about 20 μm, about 1 to about 20 μm, about 10 to about 20 μm, about 2 to about 15 μm, or about 7.5 to about 16 μm. In some embodiments, the silica is precipitated silica having a surface area from about 50 to about 750 m$^2$/g, about 100 to about 700 m$^2$/g, about 150 to about 650 m$^2$/g, about 200 to about 600 m$^2$/g, about 250 to about 550 m$^2$/g, about 300 to about 550 m$^2$/g, about 300 to about 510 m$^2$/g, about 350 to about 510 m$^2$/g, or about 400 to about 510 m$^2$/g, and having an average particle size from about 0.001 to about 20 μm, about 1 to about 20 μm, about 10 to about 20 μm, about 2 to about 15 μm, or about 7.5 to about 16 μm. In some embodiments, the silica is precipitated silica having a surface area from about 300 to about 510 m$^2$/g and an average particle size from about 1 to about 20 μm. In some embodiments, the silica is precipitated silica having a surface area from about 400 to about 510 m$^2$/g and an average particle size from about 7.5 to about 16 μm. In some embodiments, the silica is precipitated silica having a surface area from about 300 to about 750 m$^2$/g and an average particle size from about 2 to about 15 μm. In some embodiments, the silica is precipitated silica having a surface area from about 450 to about 750 m$^2$/g and an average particle size from about 7.5 to about 16 μm.

In some embodiments, the battery separator comprises: a fiber region; and a silica-containing region adjacent to the fiber region; wherein the fiber region and the silica-containing region contain fibers having an average diameter from about 2 to about 25 μm; wherein the fiber region contains less than 2% (including 0%) by weight silica; wherein the silica-containing region contains 2 to about 30% by weight silica and wherein the thickness of the fiber region constitutes greater than or equal to 25% of the total separator thickness, and the thickness of the silica-containing region constitutes greater than or equal to 30% of the total separator thickness. In some embodiments, the silica-containing region contains about 5 to about 15% by weight silica.

In some embodiments, the battery separator comprises: a fiber region; and a first silica-containing region and a second silica-containing region, wherein the fiber region is disposed between the first silica-containing region and the second silica-containing region; wherein the fiber region and each silica-containing region contains fibers having an average diameter from about 2 to about 25 μm; wherein the fiber region contains less than 2% (including 0%) by weight silica; wherein each silica-containing region independently contains 2 to about 30% by weight silica; and wherein the thickness of the fiber region constitutes greater than or equal to 25% of the total separator thickness, and the thickness of the silica-containing regions constitutes greater than or equal to 30% of the total separator thickness. In some embodiments, each silica-containing region independently contains about 5 to about 15% by weight silica.

In some embodiments, the thickness of the fiber region constitutes greater than or equal to 25%, greater than or equal to 30%, greater than or equal to 35%, greater than or equal to 40%, greater than or equal to 45%, greater than or equal to 50%, greater than or equal to 55%, greater than or equal to 60%, greater than or equal to 65%, 25 to 70%, about 30 to about 65%, about 30 to about 60%, about 30 to about 55%, about 30 to about 50%, about 30 to about 45%, about 35 to about 55%, about 35 to about 50% or about 40 to about 55% of the total separator thickness.

In some embodiments, each silica-containing region independently contains 2 to about 30%, about 3 to about 25%, about 4 to about 20% or about 5 to about 15% by weight silica.

In some embodiments, the thickness of the silica-containing region(s) constitutes greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, 30 to 75%, about 35 to about 70%, about 35 to about 65%, about 35 to about 60%, about 35 to about 55%, about 35 to about 50%, about 40 to about 70%, about 40 to about 65%, about 40 to about 60%, about 40 to about 55%, about 45 to about 70%, about 45 to about 65%, about 45 to about 60%, about 50 to about 70%, about 50 to about 65% or about 55 to about 70% of the total separator thickness.

In some embodiments, the battery separator comprises a first silica-containing region and a second silica-containing region; the thickness of the first silica-containing region constitutes greater than or equal to 10%, greater than or equal to 15% or greater than or equal to 20% of the total separator thickness; and the thickness of the silica-containing regions constitutes greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, 30 to 75%, about 35 to about 70%, about 35 to about 65%, about 35 to about 60%, about 35 to about 55%, about 35 to about 50%, about 40 to about 70%, about 40 to about 65%, about 40 to about 60%, about 40 to about 55%, about 45 to about 70%, about 45 to about 65%, about 45 to about 60%, about 50 to about 70%, about 50 to about 65% or about 55 to about 70% of the total separator thickness.

In some embodiments, the battery separator comprises a first silica-containing region and a second silica-containing region; the thickness of the first silica-containing region constitutes greater than or equal to 10%, greater than or equal to 15% or greater than or equal to 20% of the total separator thickness; and the thickness of the silica-containing regions constitutes greater than or equal to 30%, greater than or equal to 35%, greater than or equal to 40%, greater than or equal to 45%, greater than or equal to 50%, greater than or equal to 55%, greater than or equal to 60%, greater than or equal to 65%, greater than or equal to 70%, 30 to 75%, about 35 to about 70%, about 35 to about 65%, about 35 to about 60%, about 35 to about 55%, about 35 to about 50%, about 40 to about 70%, about 40 to about 65%, about 40 to about 60%, about 40 to about 55%, about 45 to about 70%, about 45 to about 65%, about 45 to about 60%, about 50 to about 70%, about 50 to about 65% or about 55 to about 70% of the total separator thickness; and each silica-containing region independently contains 2 to about 30%, about 3 to about 25%, about 4 to about 20% or about 5 to about 15% by weight silica.

In some embodiments, the fiber region and each silica-containing region contains fibers having an average diameter from about 2 to about 25 μm, about 2 to about 20 μm, about 2 to about 15 μm, about 2 to about 10 μm, about 3 to about 25 μm, about 3 to about 20 μm, about 3 to about 15 μm, about 3 to about 10 µm, about 4 to about 25 µm, about 4 to about 20 µm, about 4 to about 15 µm or about 4 to about 10 µm.

In some embodiments, the fiber region and each silica-containing region contains fibers having an average diameter from about 2 to about 25 µm, about 2 to about 20 µm, about 2 to about 15 µm, about 2 to about 10 µm, about 3 to about 25 µm, about 3 to about 20 µm, about 3 to about 15 µm, about 3 to about 10 µm, about 4 to about 25 µm, about 4 to about 20 µm, about 4 to about 15 µm or about 4 to about 10 µm; and the silica is precipitated silica having a surface area from about 50 to about 750 $m^2/g$, about 100 to about 700 $m^2/g$, about 150 to about 650 $m^2/g$, about 200 to about 600 $m^2/g$, about 250 to about 550 $m^2/g$, about 300 to about 550 $m^2/g$, about 300 to about 510 $m^2/g$, about 350 to about 510 $m^2/g$, or about 400 to about 510 $m^2/g$, and having an average particle size from about 0.001 to about 20 µm, about 1 to about 20 µm, about 10 to about 20 µm, about 2 to about 15 µm, or about 7.5 to about 16 µm.

In some embodiments, a separator of the invention exhibits an acid stratification distance of about 4 to about 14 cm, about 4 to about 12 cm, about 4 to about 10 cm, about 6 to about 14 cm, about 6 to about 12 cm, about 6 to about 10 cm, about 8 to about 14 cm, about 8 to about 12 cm, or about 8 to about 10 cm. The acid stratification distance is measured as described in Example 2.

In some embodiments, a separator of the invention exhibits an acid filling speed of about 30 to about 70 seconds, about 30 to about 60 seconds, about 30 to about 50 seconds, about 30 to about 40 seconds, about 35 to about 70 seconds, about 35 to about 60 seconds, or about 35 to about 50 seconds. The acid filling speed is measured as described in Example 2.

In some embodiments, a separator of the invention exhibits an acid stratification distance of about 4 to about 14 cm, about 4 to about 12 cm, about 4 to about 10 cm, about 6 to about 14 cm, about 6 to about 12 cm, about 6 to about 10 cm, about 8 to about 14 cm, about 8 to about 12 cm, or about 8 to about 10 cm, and exhibits an acid filling speed of about 30 to about 70 seconds, about 30 to about 60 seconds, about 30 to about 50 seconds, about 30 to about 40 seconds, about 35 to about 70 seconds, about 35 to about 60 seconds, or about 35 to about 50 seconds. The acid stratification distance and the acid filling speed are measured as described in Example 2.

Any of the fibers described above can be used for the fibers of the fiber region.

Any of the processes described above can be used to make the separator. For example, fiber and silica-containing regions can be made separately as described, and then laminated into a two-layer (one silica-containing region) or three-layer (two silica-containing regions) separator. Similarly, the wet laid process described above can be used to create the separator by using separate stock flows for the fiber region and the silica-containing region(s), in which the stock flow of the latter contains the desired amount of silica.

Alternatively, a single-region separator can be made using any of the processes described above, and silica particles can be applied to the separator to form one or two silica-containing regions. Any method suitable for such application of silica is contemplated to be within the scope of the invention. For example, silica particles can be pre-dispersed/suspended in a liquid (e.g., water), and the resultant suspension can then be applied (e.g., by spraying or curtain coating, etc.) onto the pre-formed separator on either or both sides.

Batteries

In one aspect, the invention relates to a lead-acid battery comprising a negative plate, a positive plate, and any battery separator described herein.

Thus, in one aspect, the invention relates to a lead-acid battery comprising a negative plate, a positive plate, and a battery separator disposed between the negative and positive plates, wherein the battery separator comprises: a middle fiber region; a first peripheral fiber region; and a second peripheral fiber region; wherein the middle fiber region comprises fibers having an average diameter from 2 to about 50 µm; and (a) from about 1 to 50% by weight fibers having an average diameter from about 0.1 to less than 2 µm, or (b) from about 1 to about 40% by weight silica, or (c) from about 1 to about 40% by weight fibers having an average diameter from about 0.1 to less than 2 µm, and from about 1 to about 20% by weight silica; wherein each of the first and second peripheral fiber regions independently comprises glass fibers having an average diameter from about 0.1 to about 2 µm; wherein the middle fiber region is disposed between the first peripheral fiber region and second peripheral fiber region; and wherein the thickness of the middle fiber region constitutes 1-49% of the total fiber region thickness.

In one aspect, the invention relates to a lead-acid battery comprising a negative plate, a positive plate, and a battery separator disposed between the negative and positive plates, wherein the battery separator comprises: a fiber region; and either (a) a silica-containing region adjacent to the fiber region, or (b) a first silica-containing region and a second silica-containing region, wherein the fiber region is disposed between the first silica-containing region and the second silica-containing region; wherein the fiber region and each silica-containing region contains fibers having an average diameter from about 2 to about 25 µm; wherein the fiber region contains less than 2% (including 0%) by weight silica; wherein each silica-containing region independently contains greater than or equal to 2% by weight silica.

It is to be understood that the other components of the battery that are not explicitly discussed herein can be conventional battery components. Positive plates and negative plates can be formed of conventional lead acid battery plate materials. For example, in container formatted batteries, plates can include grids that include a conductive material, which can include, but is not limited to, lead, lead alloys, graphite, carbon, carbon foam, titanium, ceramics (such as) Ebonex®, laminates and composite materials. The grids are typically pasted with active materials. The pasted grids are typically converted to positive and negative battery plates by a process called "formation." Formation involves passing an electric current through an assembly of alternating positive and negative plates with separators between adjacent plates while the assembly is in a suitable electrolyte.

As a specific example, positive plates contain lead as the active material, and negative plates contain lead dioxide as the active material. Plates can also contain one or more reinforcing materials, such as chopped organic fibers (e.g., having an average length of 0.125 inch or more), chopped glass fibers, metal sulfate(s) (e.g., nickel sulfate, copper sulfate), red lead (e.g., a $Pb_3O_4$-containing material), litharge, paraffin oil, and/or expander(s). In some embodiments, an expander contains barium sulfate, carbon black and lignin sulfonate as the primary components. The components of the expander(s) can be pre-mixed or not pre-mixed. Expanders are commercially available from, for example, Hammond Lead Products (Hammond, Ind.) and Atomized Products Group, Inc. (Garland, Tex.). An example of a commercially available expander is Texex® expander (Atomized Products Group, Inc.). In certain embodiments, the expander(s), metal sulfate(s) and/or paraffin are present in positive plates, but not negative plates. In some embodiments, positive plates and/or negative plates contain fibrous material or other glass compositions.

A battery can be assembled using any desired technique. For example, separators are wrapped around plates (e.g., cathode plates, anode plates). positive plates, negative plates and separators are then assembled in a case using conventional lead acid battery assembly methods. In certain embodiments, separators are compressed after they are assembled in the case, i.e., the thickness of the separators are reduced after they are placed into the case. An electrolytic mixture (e.g., just sulfuric acid, or sulfuric acid and silica, sulfuric acid and particles of the glass compositions described herein, etc.) is then disposed in the case.

The electrolytic mixture can include other compositions. For example, the electrolytic mixture can include liquids other than sulfuric acid, such as a hydroxide (e.g., potassium hydroxide). In some embodiments, the electrolytic mixture includes one or more additives, including but not limited to a mixture of an iron chelate and a magnesium salt or chelate, organic polymers and lignin and/or organic molecules, and phosphoric acid. In some embodiments, the electrolyte is sulfuric acid. In some embodiments, the specific gravity of the sulfuric acid is between 1.21 g/cm$^3$ and 1.32 g/cm$^3$, or between 1.28 g/cm$^3$ and 1.31 g/cm$^3$. In certain embodiments the specific gravity of the sulfuric acid is 1.26 g/cm$^3$. In certain embodiments the specific gravity of the sulfuric acid is about 1.3 g/cm$^3$.

EXAMPLES

Example 1. Separators

Example 1.1. High Surface Area Control Separator

The high surface area control separator ("standard (high SSA)") used in Example 2 has the following composition (all percentages are by weight): 86% glass microfibers (diameter 0.8 to 1.4 µm, average diameter 1.1 µm), 8% PET core/PE sheath bicomponent organic fibers (1.3 DTEX, 12 mm long), 6% chop strand (13.5 µm dia, ½ inch long) glass fibers.

Example 1.2. Low Surface Area Control Separator

The low surface area control separator ("standard (low SSA)") used in Example 2 has the following composition (all percentages are by weight): 86% glass microfiber (diameter 0.8 to 1.9 µm, average diameter 1.5 µm), 8% PET core/PE sheath bicomponent organic fibers (1.3 DTEX, 12 mm long), 6% chop strand (13.5 µm dia, ½ inch long) glass fibers.

Example 1.3. Three-region Control Separator

The three-region control separator ("3-region") used in Example 2 was made by laminating the middle fiber region (about 40% by weight, made from Composition B) between two peripheral fiber regions (made from Composition A):
Composition A (peripheral fiber region) (all percentages are by weight): 86% glass microfibers (diameter 0.8 to 1.4 µm, average diameter 1.1 µm), 8% PET core/PE sheath bicomponent organic fibers (1.3 DTEX, 12 mm long), 6% chop strand (13.5 µm dia, ½ inch long) glass fibers;
Composition B (middle fiber region) (all percentages are by weight): 86% glass microfiber (diameter 8.5 µm), 8% PET core/PE sheath bicomponent organic fibers (1.3 DTEX, 12 mm long), 6% chop strand (13.5 µm dia, ½ inch long) glass fibers.

Example 1.4. Three-region Separators (Laminated)

Each of the three-region separators used in Example 2 was made by laminating the appropriate middle fiber region (about 40% by weight, made from Composition B1, B2, B3, B4, B5, B6 or B7) between two peripheral fiber regions (made from Composition A):
Composition A (peripheral fiber region) (all percentages are by weight): 86% glass microfibers (diameter 0.8 to 1.4 µm, average diameter 1.1 µm), 8% PET core/PE sheath bicomponent organic fibers (1.3 DTEX, 12 mm long), 6% chop strand (13.5 µm dia, ½ inch long) glass fibers;
Composition B1 (middle fiber region+silica) (all percentages are by weight): 76.6% glass microfiber (diameter 8.5 µm), 8% PET core/PE sheath bicomponent organic fibers (1.3 DTEX, 12 mm long), 5.4% chop strand (13.5 µm dia, ½ inch long) glass fibers, 10% silica (Sipernat® 50S, BET surface area of 475 m$^2$/g);
Composition B2 (middle fiber region+fine fiber) (all percentages are by weight): 76.6% glass microfiber (diameter 8.5 µm), 8% PET core/PE sheath bicomponent organic fibers (1.3 DTEX, 12 mm long), 5.4% chop strand (13.5 µm dia, ½ inch long) glass fibers, 10% glass microfiber (diameter 1.4 µm);
Composition B3 (middle fiber region+fine fiber+silica) (all percentages are by weight): 67.3% glass microfiber (diameter 8.5 µm), 8% PET core/PE sheath bicomponent organic fibers (1.3 DTEX, 12 mm long), 4.7% chop strand (13.5 µm dia, ½ inch long) glass fibers, 10% glass microfiber (diameter 1.4 µm), 10% silica (Sipernat® 50S, BET surface area of 475 m$^2$/g);
Composition B4 (middle fiber region+12.5% fine fiber) (all percentages are by weight): 74.3% glass microfiber (diameter 8.5 µm), 8% PET core/PE sheath bicomponent organic fibers (1.3 DTEX, 12 mm long), 5.2% chop strand (13.5 µm dia, ½ inch long) glass fibers, 12.5% glass microfiber (diameter 1.4 µm);
Composition B5 (middle fiber region+25% fine fiber) (all percentages are by weight): 62.6% glass microfiber (diameter 8.5 µm), 8% PET core/PE sheath bicomponent organic fibers (1.3 DTEX, 12 mm long), 4.4% chop strand (13.5 µm dia, ½ inch long) glass fibers, 25% glass microfiber (diameter 1.4 µm);
Composition B6 (middle fiber region+37.5% fine fiber) (all percentages are by weight): 51.0% glass microfiber (diameter 8.5 µm), 8% PET core/PE sheath bicomponent organic fibers (1.3 DTEX, 12 mm long), 3.5% chop strand (13.5 µm dia, ½ inch long) glass fibers, 37.5% glass microfiber (diameter 1.4 µm);
Composition B7 (middle fiber region+50% fine fiber) (all percentages are by weight): 39.3% glass microfiber (diameter 8.5 µm), 8% PET core/PE sheath bicomponent organic fibers (1.3 DTEX, 12 mm long), 2.7% chop strand (13.5 µm dia, ½ inch long) glass fibers, 50% glass microfiber (diameter 1.4 µm);

Example 1.5. Three-region Separators

Separators of the invention can also be made by using a multi-phase process or a multi-phase+lamination process as described above. For example, the separators described in Example 1.4 can be made using the following procedure, where "Composition B" refers to Composition B1, B2, B3, B4, B5, B6 or B7, as appropriate.

Fibers for Composition A are added to a hydropulper one by one containing water and sulfuric acid to form a fiber dispersion slurry. The pH is maintained at 2.7. The fiber slurry is stored in a chest (tank) under agitation. The same process is repeated for Composition B and the fiber slurry thus prepared is stored in a second chest under agitation. The two chests supply the slurries to the pressurized headbox of the paper machine (Fourdrinier). Composition A forms the bottom flow and Composition B forms the top flow in the pressurized headbox. The two flows are separated by a lamella. Composition A is the first layer to contact the wire of the forming zone using dewatering (vacuum). Further down the wire, the point where lamella ends, Composition B contacts the top of Composition A, thus creating a two layer structure with 100 gsm of peripheral fiber region (composition A) as base and 20 gsm of middle fiber region (composition B) as top. Vacuum is used to dewater the two layer separator. The two layer separator is then dried using steam heated drier cans and a through-air dryer (hot air causes melting of sheath of bico fibers and creates bonding between organic fiber and glass fibers). The two-layer battery separator is collected at the other end of the machine on rolls. The two-layer separator thus made, is then laminated to a single layer battery separator (made from Composition A, forming the second peripheral fiber region) wherein the middle region of the two layer separator is in physical contact with the single layer separator. A three-region separator is thus created with the middle fiber region disposed between two peripheral fiber regions.

Example 2. Measurement of Separator Properties

Example 2.1. Measurement of Tensile Strength

The tensile strength is measured according to Battery Council International Battery Technical Manual BCIS-03A (Rev. February 02) ("Recommended Battery Materials Specifications: Valve Regulated Recombinant Batteries)", method number 13, "Standard Test Method for Tensile Strength and Percent Elongation Measurements on Recombinant Battery Separator Mat", incorporated by reference herein in its entirety.

The tensile strength of various separators of the invention and the 3-region control separator (Example 1.3) was measured. Separators of the invention tested had the same composition as the control plus the amount of fine fiber in the middle region indicated in the table below.

| % by weight fine fiber (1.4 µm diameter glass fiber) in middle region | Tensile Strength (MD) (lb/in) | Tensile Strength (CD) (lb/in) |
| --- | --- | --- |
| 0 (control) | 1.69 | 1.56 |
| 12.5 | 2.06 | 1.80 |
| 25 | 2.19 | 1.99 |
| 37.5 | 2.29 | 2.11 |
| 50 | 2.36 | 2.14 |

As shown in the table above and in FIGS. 1 and 2, the tested separators of the invention exhibited about a 22 to 40% increase in tensile strength (MD), and about a 15 to 37% increase in tensile strength (CD) compared to the control separator.

Example 2.2. Measurement of Acid Diffusion Speed

The speed at which sulfuric acid diffuses in a separator while under compression can be measured using the following procedure. The measured diffusion speed can provide an indication of potential acid filling speed and separator wettability within a battery cell.

Figures 5A, 5B:
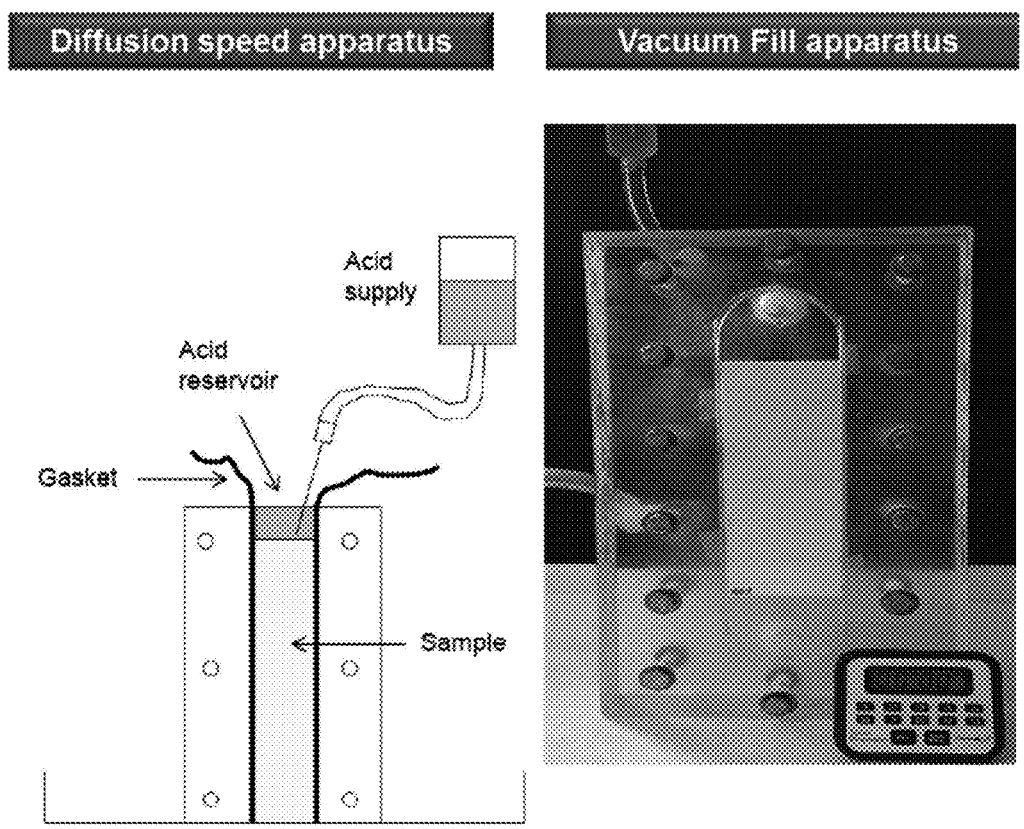
FIG. 5A shows the diffusion speed test apparatus for use with the procedure described in Example 2.
FIG. 5B shows the vacuum fill apparatus for use with the procedure described in Example 2.

Equipment
Methyl red, diluted in 1.28 specific gravity sulfuric acid (1:100 dilution)
Glass-mat separator (AGM)
300×150×50 mm Perspex blocks, with holes drilled for attaching
Screw-thread, nuts and washers
Shims, various thicknesses, for the required gap
Rubber gasket or O-ring cord, various diameters, for 'sealing' the sample
Pyrex dish to hold block assembly
Timer/stopwatch Sample preparation
1. Measure the grammage of the separator, to one decimal point, in $g/m^2$ (W).
2. Measurements of diffusion speed are typically made at about 200 $g/m^2/mm$ compressed density and/or about 240 $g/m^2/mm$ compressed density.
3. Calculate the required thickness for each density value:
   3.1. Thickness=grammage÷ compressed density (either 200 or 240).
4. Determine the shims and o-ring cords required for each thickness calculated:
   4.1. Shims should be to the nearest available thickness increment.
   4.2. O-ring cord diameter should be equal to, or greater than, the shim thickness, but no more than 0.5 mm greater.
5. Cut two samples of separator, 250×50 mm, in the machine direction.
6. Put the bolts through the Perspex base and lay the assembly on the bench.
7. Place dry sample on the Perspex base.
8. Align the o-ring cords tight to the edges of the separator.
9. Put the required shims onto each bolt.
10. Add the Perspex face to the top of this assembly and finger-tighten the nuts.
11. Push the o-ring cords tightly to the sample edge all along the AGM, particularly at the top.
12. Tighten the nuts using the torque wrench (set at 10 Nm/88.5 in/lbf). (refer to FIG. 5A.)

Sample testing
13. Put the full block in an empty Pyrex dish.
14. Add dyed sulfuric acid (SG 1.28 $g/cm^2$) into the space at the top of the sample and start the timer (60-minute countdown).
15. The acid will travel or diffuse through the pores of the separator and a visual red/pink 'tide mark' will be observed, displaying the magnitude of displacement or diffusion.
16. Check the status of the displacement at regular intervals (every 1 minute initially; varies with sample).
17. After the 60 minutes is completed, measure the total acid displacement (distance from the top of the sample to the red/pink mark).
18. Report diffusion speed, at each density measured, in terms of average time in seconds for the acid front to reach 6 cm from top of the sample.

Example 2.3. Measurement of Vacuum Fill (Acid Filling) Time

Equipment
1.28 specific gravity sulfuric acid
Glass-mat separator (AGM)
6"×1.9375" Die
300×150×50 mm Perspex blocks, with holes drilled for attaching
Screw-thread, nuts and washers
Shims, various thicknesses, for the required gap
Rubber gasket or O-ring cord for 'sealing' the sample
Acid feed assembly (cut bottles with tubing), including stand and clamps
Vacuum pump
Timer/stopwatch
Sample Preparation
1. Measure the grammage of the separator, to one decimal point, in g/m² (W).
2. Calculate the required thickness for each density value:
   2.1. Thickness=grammage÷compressed density (either 200 or 240).
3. Determine the shims and o-ring cords required for each thickness calculated:
   3.1. Shims should be to the nearest available thickness increment.
   3.2. O-ring cord diameter should be equal to, or greater than, the shim thickness, but no more than 0.5 mm greater.
4. Use the 6"×1.9375" die to cut the sample in the machine direction.
5. Weigh the sample to determine the amount of acid needed.
6. Mark the sample at every inch.
7. Put the bolts through the Perspex base and lay the assembly on the bench.
8. Place the sample on the Perspex base in between the grooves on the plate.
9. Align the rubber gasket on the edges of the separator in the grooves on the plate.
10. Put the required shims onto each bolt.
11. Add the Perspex face to the top of this assembly and finger-tighten the nuts.
12. Tighten the nuts using the torque wrench (set at 10 N). (refer to FIG. 5B.)
Sample Testing
13. Stand the block upright and plug in the acid feed assembly.
14. Add the appropriate amount of acid to the top of the feed system. Make sure the valve is closed.
15. Turn the vacuum pump on and pump down to 530 mm Hg.
16. When the system reaches the correct pressure, open up the valve to the acid and record the acid front travel time at every inch.

Example 2.4. Measurement of Acid Stratification Distance

This method is used to determine the degree to which sulfuric acid displaces water in a glass-mat separator while under compression. The measured stratification distance can provide an indication of potential stratification within a battery cell, a phenomenon in which the specific gravity of the electrolyte (acid) varies throughout the height of the cell.

Figure 8:
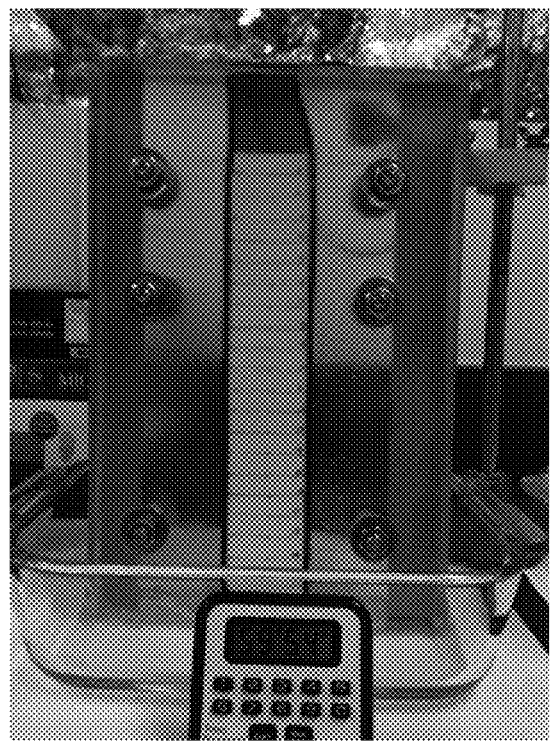
FIG. 8 shows the acid stratification apparatus for use with the procedure described in Example 2.

Equipment
Methyl red, diluted in 1.28 specific gravity sulfuric acid (1:100 dilution)
1.1 specific gravity sulfuric acid
Glass-mat separator (AGM)
300×150×50 mm Perspex blocks, with holes drilled for attaching
Screw-thread, nuts and washers
Shims, various thicknesses, for the required gap
Rubber gasket or O-ring cord, various diameters, for 'sealing' the sample
Pyrex dish to hold block assembly and acid
Timer/stopwatch
Sample Preparation
1. Measure the grammage of the separator, to one decimal point, in g/m² (W).
2. Measurements of acid stratification distance are typically made at about 200 g/m²/mm compressed density and/or about 240 g/m²/mm compressed density.
3. Calculate the required thickness for each density value:
   3.1. Thickness=grammage÷compressed density (either 200 or 240).
4. Determine the shims and o-ring cords required for each thickness calculated:
   4.1. Shims should be to the nearest available thickness increment.
   4.2. O-ring cord diameter should be equal to, or greater than, the shim thickness, but no more than 0.5 mm greater.
5. Cut two samples of separator, 250×50 mm, in the machine direction.
6. Immerse the sample in 1.1 s.g. acid for one minute.
7. Put the bolts through the Perspex base and lay the assembly on the bench.
8. Place wet sample on the Perspex base.
9. Align the o-ring cords tight to the edges of the separator.
10. Put the required shims onto each bolt.
11. Add the Perspex face to the top of this assembly and finger-tighten the nuts.
12. Push the o-ring cords tightly to the sample edge all along the AGM, particularly at the top.
13. Tighten the nuts using the torque wrench (set at 10 Nm/88.5 in/lbf). (refer to FIG. 8.)
Sample Testing
14. Put the full block in an empty Pyrex dish with a 20 mm 1.1 s.g. acid level.
15. Add dyed sulfuric acid (SG 1.28 g/cm²) into the space at the top of the sample and start the timer (60-minute countdown).
16. The acid will travel or diffuse through the pores of the separator and a visual red/pink 'tide mark' will be observed, displaying the magnitude of displacement.
17. Check the status of the displacement at regular intervals (every 15 minutes is sufficient).
18. After the 60 minutes is completed, measure the total acid displacement (distance from the top of the sample to the red/pink mark).
19. Report acid stratification distance, at each density measured in mm.
3. Three-region Separator.
The furnishes used to form hand sheets with and without silica particles are shown in the table below.

| Raw Materials | AGM (% by weight) | AGM-SiO$_2$ (% by weight) |
|---|---|---|
| Glass fiber-1 (diameter: 1.4 μm) | 22.00 | 19.80 |
| Glass fiber-2 (diameter: 0.8 μm) | 10.00 | 9.00 |
| Glass fiber-3 (diameter: 8.5 μm) | 46.90 | 42.21 |
| Bicomponent polyester/polyethylene fiber (diameter: 13 μm) | 15.50 | 13.95 |
| Glass fiber chopped strand (diameter: 13.5 μm) | 5.60 | 5.04 |
| Precipitated silica (average particle size: 16 μm; specific surface area, 485 m$^2$/g) | | 9.85 |
| Guar gum-based flocculating agent | | 0.23 |
| Totals | 100 | 100 |

The hand sheets based on the above furnishes were formed according to the following procedures.

Formation of AGM Hand Sheets.
1. Fill a laboratory-scale stainless steel pulper (capacity: 45 L) with 27 L water and 41 mL of 25% sulfuric acid.
2. Add glass fiber-1 and glass fiber-2 into the pulper and start mixing for 5 min under the setting (8).
3. Add glass fiber-3 into the pulper and start mixing for 5 min under the setting (4).
4. Add chopped strand glass fibers and Bicomponent fibers into the pulper and start mixing for 5 min under the setting (4).
5. Fill a laboratory-scale cubic headbox (12"×12"×12") and add 10 mL of 25% sulfuric acid.
6. Measure out stock (GSM target: 135) and add to headbox, drained, vacuum; between sheets, keep the pulper stirring.
7. Dry the sheet in photo drier at 90° C. for 2 h.
8. Dry the sheet at 150° C. for 2 min.

Formation of AGM-SiO$_2$ Hand Sheets.
1. Fill a laboratory-scale stainless steel pulper (capacity: 45 L) with 27 L water and 41 mL of 25% sulfuric acid.
2. Add glass fiber-1 and glass fiber-2 into the pulper and start mixing for 5 min under the setting (8).
3. Add glass fiber-3 and silica into the pulper and start mixing for 5 min under the setting (4).
4. Add chopped strand glass fibers and Bicomponent fibers into the pulper and start mixing for 5 min under the setting (4).
5. Set the mixer speed to setting (2) and slowly add the flocculating agent solution in 30 sec.
6. After adding the flocculating agent keep stirring the pulper at the low (2) setting for anther 5 min.
7. Fill the headbox and add 10 mL of 25% sulfuric acid.
8. Measure out stock (GSM target: 135) and add to headbox, drained, vacuum; between sheets, keep the pulper stirring.
9. Dry the sheet in photo drier at 90° C. for 2 h.
10. Dry the sheet at 150° C. for 2 min.

Properties of these hand sheets are shown in the table below.

| Properties | AGM | AGM-SiO$_2$ |
|---|---|---|
| gsm | 134.8 | 133.7 |
| Thickness (mm) | 0.85 | 0.79 |
| Density (gsm/mm) | 160.6 | 170.1 |
| Air permeability (CFM) | 20.3 | 12.9 |
| Max pore (micron) | 48.5 | 42.5 |
| Specific surface area (m$^2$/g) | 0.73 | 25.12 |

A 3-region separator was created by laminating the sheets as AGM-SiO$_2$/AGM/AGM-SiO$_2$. A reference AGM/AGM/AGM separator was also created.

The acid stratification distance of each separator was measured as described in Example 2 (compressed density 240 g/m$^2$/mm). The reference AGM/AGM/AGM separator showed an average (of 2 runs) travel distance of 17.5 cm, while the AGM-SiO$_2$/AGM/AGM-SiO$_2$ separator showed an average (of 2 runs) travel distance of 9.0 cm. This represents about a 50% decrease in acid stratification distance, i.e., about a 50% improvement in resistance to acid stratification.

The acid filling speed of each separator was measured as described in Example 2 (compressed density 200 g/m$^2$/mm). The reference AGM/AGM/AGM separator showed an average (of 2 runs) acid filling time of about 27.5 seconds, while the AGM-SiO$_2$/AGM/AGM-SiO$_2$ separator showed an average (of 2 runs) acid filling time of about 34.5 seconds. This represents about a 25% decrease in acid filling time.

Thus, it is shown that a separator of the invention exhibits about a 50% improvement in resistance to acid stratification with only about a 25% decrease in acid filling time. In this way a separator of the invention exhibits a balanced improvement in properties.

What is claimed is:

1. A battery separator, comprising:
   a middle fiber region;
   a first peripheral fiber region; and
   a second peripheral fiber region;
   wherein the middle fiber region comprises fibers having an average diameter of greater than or equal to about 2 μm; and
   wherein each of the first and second peripheral fiber regions independently comprises glass fibers having an average diameter from about 0.1 to about 2 μm;
   provided that the average diameter of the fibers of the middle fiber region is larger than the average diameter of the fibers of each of the first and second peripheral fiber regions;
   wherein the middle fiber region is disposed between the first peripheral fiber region and the second peripheral fiber region;
   wherein the thickness of the middle fiber region constitutes 10-40% of the total fiber region thickness; and
   wherein the thickness of the first peripheral fiber region is different from the thickness of the second peripheral fiber region.

2. A lead-acid battery comprising a negative plate, a positive plate, and a battery separator according to claim 1, wherein the battery separator is disposed between the negative and positive plates.

3. The battery separator according to claim 1, wherein the middle fiber region comprises glass fibers having an average diameter from 2 to about 50 μm.

4. The battery separator according to claim 1, wherein the middle fiber region comprises fibers having an average diameter from about 3 to about 15 μm.

5. The battery separator according to claim 1, wherein the middle fiber region comprises glass fibers having an average diameter from about 3 to about 15 μm.

6. The battery separator according to claim 1, wherein each of the first and second peripheral fiber regions independently comprises glass fibers having an average diameter from about 0.4 to about 1.8 μm.

7. The battery separator according to claim 1, wherein the thickness of the middle fiber region constitutes 10-30% of the total fiber region thickness.

8. The battery separator according to claim 1, wherein the middle fiber region comprises from about 10 to about 30% by weight fibers having an average diameter from about 0.8 to about 1.6 μm.

9. The battery separator according to claim 1, wherein the middle fiber region comprises from about 2 to about 30% by weight silica.

10. The battery separator according to claim 1, wherein the average glass fiber diameter of the first peripheral fiber region differs from the average glass fiber diameter of the second peripheral fiber region by greater than or equal to 0.5 μm.

11. The battery separator according to claim 1, wherein the middle fiber region comprises from about 1 to 50% by weight fibers having an average diameter from about 0.1 to less than 2 μm, and wherein the tensile strength (machine direction) of the separator is about 2.00 to about 2.40 lbs/inch.

12. The battery separator according to claim 1, wherein the middle fiber region comprises from about 1 to 50% by weight fibers having an average diameter from about 0.1 to less than 2 μm, and wherein the tensile strength (cross direction) of the separator is about 1.75 to about 2.20 lbs/inch.

13. The battery separator according to claim 1, wherein the separator exhibits an acid filling time of about 30 to about 70 seconds.

14. The battery separator according to claim 1, wherein the separator exhibits an acid filling time of about 17 to about 50 seconds.

15. The battery separator according to claim 1, wherein the separator exhibits an acid stratification distance from about 2.5 to about 16 cm.

16. The battery separator according to claim 1, wherein the middle fiber region comprises from about 5 to about 50% by weight glass fibers having an average diameter from about 0.1 to less than 2 μm.

17. The battery separator according to claim 1, wherein the middle fiber region comprises from about 5 to about 50% by weight glass fibers having an average diameter from about 0.8 to about 1.6 μm.

18. A battery separator, comprising:
a middle fiber region;
a first peripheral fiber region; and
a second peripheral fiber region;
wherein the middle fiber region comprises fibers having an average diameter of greater than or equal to about 2 μm; and
wherein each of the first and second peripheral fiber regions independently comprises glass fibers having an average diameter from about 0.1 to about 2 μm;
provided that the average diameter of the fibers of the middle fiber region is larger than the average diameter of the fibers of each of the first and second peripheral fiber regions;
wherein the middle fiber region is disposed between the first peripheral fiber region and the second peripheral fiber region;
wherein the thickness of the middle fiber region constitutes 10-40% of the total fiber region thickness;
wherein the thickness of the first peripheral fiber region is different from the thickness of the second peripheral fiber region; and
wherein formation of the battery separator involves a process comprising:
(a) providing a first slurry of fibers having an average diameter from about 0.1 μm to about 2 μm;
(b) laying down the first slurry on a wire of a papermaking machine;
(c) providing a second slurry of fibers having an average diameter of greater than or equal to about 2 μm;
(d) laying down the second slurry on top of the first slurry; and
(e) dewatering the first and second slurries to form a 2-layer structure comprising the first peripheral region and at least a portion of the middle fiber region.

* * * * *